US012739335B2

(12) United States Patent
Tamagawa

(10) Patent No.: US 12,739,335 B2
(45) Date of Patent: Sep. 15, 2026

(54) IMAGE MANAGEMENT APPARATUS, CONTROL METHOD, AND STORAGE MEDIUM

(71) Applicant: CANON KABUSHIKI KAISHA, Tokyo (JP)

(72) Inventor: Kei Tamagawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 260 days.

(21) Appl. No.: 18/342,340

(22) Filed: Jun. 27, 2023

(65) Prior Publication Data

US 2024/0007575 A1 Jan. 4, 2024

(30) Foreign Application Priority Data

Jul. 1, 2022 (JP) ................................ 2022-106943

(51) Int. Cl.
*H04N 1/32* (2006.01)
*G06F 3/04847* (2022.01)
*H04N 1/00* (2006.01)

(52) U.S. Cl.
CPC ..... *H04N 1/32358* (2013.01); *G06F 3/04847* (2013.01); *H04N 1/00244* (2013.01); *H04N 1/00344* (2013.01); *H04N 2201/0084* (2013.01)

(58) Field of Classification Search
CPC ........... H04N 1/32358; H04N 1/00244; H04N 1/00344; H04N 2201/0084; H04N 1/00347; H04N 1/00408; H04N 23/661; H04N 7/18; H04N 5/76; H04N 21/2743; H04N 5/77; H04N 21/2223; H04N 21/231; H04N 1/32; H04N 1/00; H04N 21/222; G06F 3/04847; H04L 67/10
See application file for complete search history.

(56) References Cited

U.S. PATENT DOCUMENTS

| | | | | |
|---|---|---|---|---|
| 11,363,150 | B2 * | 6/2022 | Matsushita ............ | H04N 5/265 |
| 2005/0213147 | A1 | 9/2005 | Minatogawa | |
| 2010/0289920 | A1 * | 11/2010 | Mizuno .................. | H04N 5/772 348/E5.031 |
| 2011/0007901 | A1 * | 1/2011 | Ikeda ................ | H04N 1/00342 380/270 |
| 2011/0205373 | A1 | 8/2011 | Wasula et al. | |

(Continued)

OTHER PUBLICATIONS

Extended European search report issued in European Appln. No. 23181944.2 mailed on Nov. 23, 2023.

(Continued)

*Primary Examiner* — Tonia L Dollinger
*Assistant Examiner* — Mehulkumar J Shah
(74) *Attorney, Agent, or Firm* — ROSSI, KIMMS & McDOWELL LLP

(57) ABSTRACT

An image management apparatus which provides a cloud service which receives a captured image transmitted from an image capturing apparatus, the cloud service having a function to transfer the received captured image to an external storage service, the image management apparatus managing transfer setting information in which the external storage service and each of one or more image capturing apparatuses associated with a specific user are associated, and transferring the received captured image based on the transfer setting information.

10 Claims, 13 Drawing Sheets

(56) References Cited

U.S. PATENT DOCUMENTS

| | | | | |
|---|---|---|---|---|
| 2014/0016165 | A1* | 1/2014 | Ando | H04N 1/00408 358/403 |
| 2015/0049923 | A1* | 2/2015 | Nobutani | G06F 21/608 382/118 |
| 2015/0350344 | A1* | 12/2015 | Sugimura | H04L 67/10 709/202 |
| 2018/0109722 | A1* | 4/2018 | Laroia | H04N 5/772 |
| 2019/0364240 | A1* | 11/2019 | Karn | H04N 1/0044 |
| 2020/0059509 | A1 | 2/2020 | Ljung | |
| 2020/0226406 | A1* | 7/2020 | Inamoto | H04N 23/698 |
| 2021/0349974 | A1* | 11/2021 | Uchibori | G06F 21/105 |
| 2022/0165140 | A1* | 5/2022 | Shekhar | G06V 20/52 |
| 2022/0303233 | A1* | 9/2022 | Tamura | G06F 16/162 |
| 2022/0309133 | A1* | 9/2022 | Hinohara | H04N 7/181 |
| 2023/0252540 | A1* | 8/2023 | Rathod | G06Q 30/0607 705/26.25 |
| 2023/0396873 | A1* | 12/2023 | Nakai | H04N 23/662 |

OTHER PUBLICATIONS

"Features Seamless upload from camera to the cloud" Image Canon.(https://image.canon/st/en/features.html?region=0, retrieved on Jun. 15, 2022, Canon Inc. "Image.canon"). pp. 1-3.

"Canon's automatic image-capturing camera PowerShot PICK" Canon Marketing Japan. (https://www.makuake.com/project/powershotpick/, retrieved on Jun. 15, 2022, Canon Marketing Japan Inc.). pp. 1-15. Concise English Explanation provided.

Extended European search report issued in European Appln. No. 25209188.9 mailed on Jan. 21, 2026.

* cited by examiner

```
{
601  "userId": "usr01",
602  "devices": [
       {
603      "deviceId": "dev01",
604      "services": [
605        { "serviceId": "srv01" },
605        { "serviceId": "srv02",
606          "disclosureRange": "public" }
         ]
       },
       {
603      "deviceId": "dev02",
604      "services": [
605        { "serviceId": "srv01" }
         ]
       }
     ]
}
```

FIG.6A

```
{
  "dev01": {
611  "deviceName": "CameraA",
612  "seriesName": "A"
  },
  "dev02": {
611  "deviceName": "CameraB",
612  "seriesName": "B"
  }
}
```

FIG.6B

```
{
  "srv01": {
621  "serviceName": "XXXDrive",
622  "uri": "https://xxx.com/upload/"
  },
  "srv02": {
621  "serviceName": "YYYDrive",
622  "uri": "https://yyy.com/upload/",
623  "disclosureRanges": [ "public", "friends", "private" ]
  }
}
```

FIG.6C

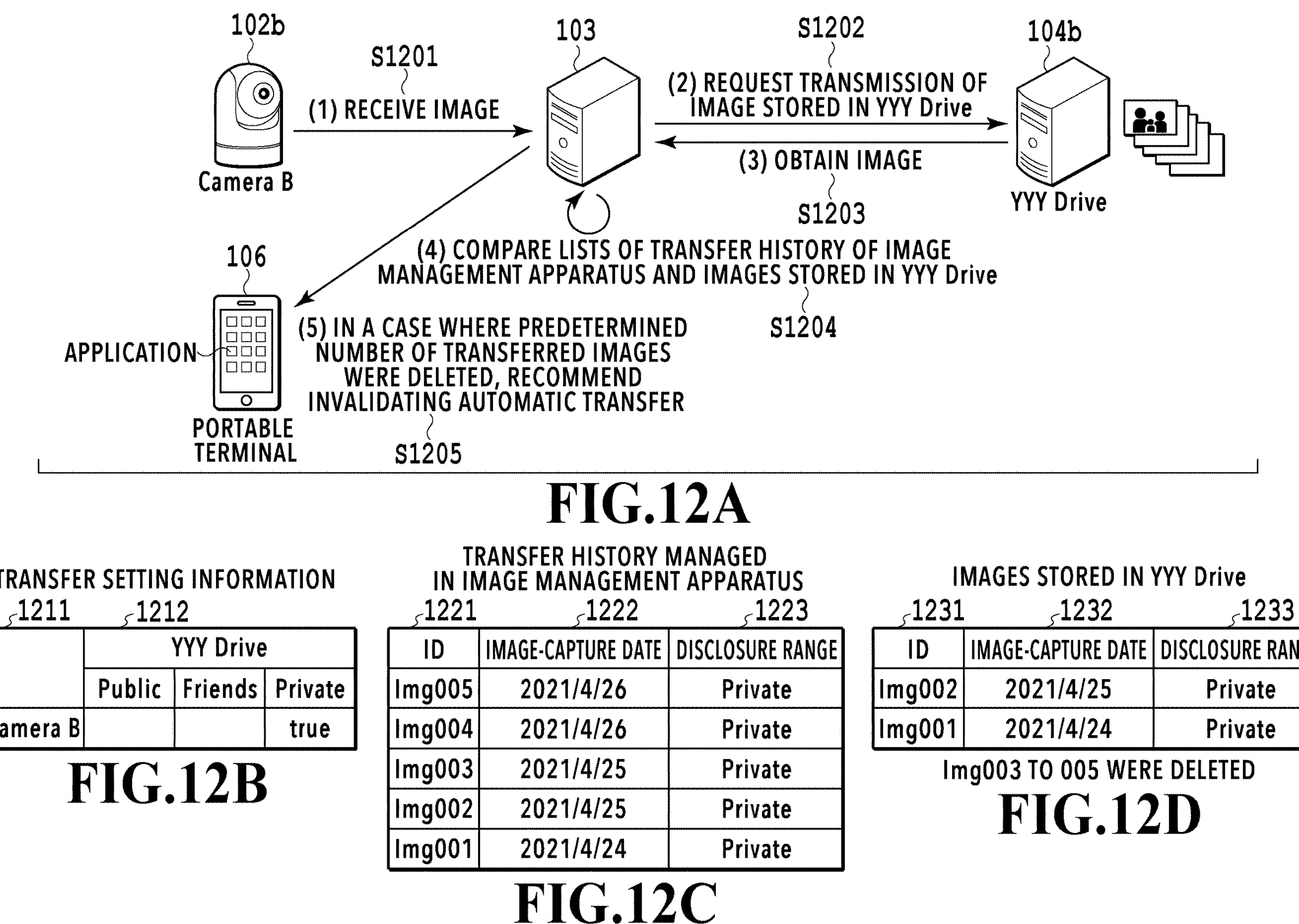

FIG.12A

TRANSFER SETTING INFORMATION 1211 1212

| | YYY Drive | | |
|---|---|---|---|
| | Public | Friends | Private |
| Camera B | | | true |

FIG.12B

TRANSFER HISTORY MANAGED IN IMAGE MANAGEMENT APPARATUS 1221 1222 1223

| ID | IMAGE-CAPTURE DATE | DISCLOSURE RANGE |
|---|---|---|
| Img005 | 2021/4/26 | Private |
| Img004 | 2021/4/26 | Private |
| Img003 | 2021/4/25 | Private |
| Img002 | 2021/4/25 | Private |
| Img001 | 2021/4/24 | Private |

FIG.12C

IMAGES STORED IN YYY Drive 1231 1232 1233

| ID | IMAGE-CAPTURE DATE | DISCLOSURE RANGE |
|---|---|---|
| Img002 | 2021/4/25 | Private |
| Img001 | 2021/4/24 | Private |

Img003 TO 005 WERE DELETED

FIG.12D

TRANSFER SETTING INFORMATION

| | YYY Drive | | |
|---|---|---|---|
| | Public | Friends | Private |
| Camera B | | true | |

DISCLOSURE RANGES OF IMAGES STORED IN YYY Drive

| ID (1331) | IMAGE-CAPTURE DATE (1332) | DISCLOSURE RANGE (1333) |
|---|---|---|
| Img005 | 2021/4/26 | Private |
| Img004 | 2021/4/26 | Private |
| Img003 | 2021/4/25 | Private |
| Img002 | 2021/4/25 | Friends |
| Img001 | 2021/4/24 | Friends |

IMAGE MANAGEMENT APPARATUS, CONTROL METHOD, AND STORAGE MEDIUM

BACKGROUND OF THE DISCLOSURE

Field of the Disclosure

The present disclosure relates to processing related to image management.

Description of the Related Art

In recent years, storage services that store data uploaded by users are being widely used.

On the Internet (https://image.canon/st/en/features.html?region=0, retrieved on Jun. 15, 2022, Canon Inc. "Image.canon") (hereinafter, NPL 1), a photo storage service that receives a captured image transmitted from a user's camera having a transmission function, and stores the received captured image in a storage region assigned to each user is described. In addition, in the photo storage service of NPL 1, if an external storage service which a user uses has been registered, a received captured image can be automatically transferred to the registered external storage service. Some external storage services provide a service to disclose captured images stored therein. By setting such automatic transfer of captured images to an external storage service in the photo storage service of NPL 1, it is possible to disclose a captured image immediately after capturing the image.

Meanwhile, as described on the Internet (https://www.makuake.com/project/powershotpick/, retrieved on Jun. 15, 2022, Canon Marketing Japan Inc., "Canon's automatic image-capturing camera PowerShot PICK") (hereinafter, NPL 2), cameras that automatically capture private images are being spread. In addition, it is possible that a user possesses a plurality of cameras each having a function to transmit captured images to the photo storage service of NPL 1. In this case, it is possible that needs arise for an operation in which captured images captured by a camera for capturing images to be disclosed are disclosed, but captured images captured by a camera for capturing images to be private are not disclosed.

However, in the photo storage service of NPL 1, once an external storage service of a transfer destination is registered, captured images transmitted to the account of the user are automatically transferred to the registered external storage service. For this reason, there is a possibility that a captured image captured by a camera for capturing images to be private is disclosed.

SUMMARY OF THE DISCLOSURE

An image management apparatus of the present disclosure is an image management apparatus which provides a cloud service which receives a captured image transmitted from an image capturing apparatus, the cloud service having a function to transfer the received captured image to an external storage service, the image management apparatus comprising: a management unit configured to manage transfer setting information in which the external storage service and each of one or more image capturing apparatuses associated with a specific user are associated; and a transfer unit configured to transfer the received captured image based on the transfer setting information.

Further features of the present disclosure will become apparent from the following description of exemplary embodiments with reference to the attached drawings.

BRIEF DESCRIPTION OF THE DRAWINGS

FIGS. 6A to 6C are diagrams showing an example of transfer setting information;

FIGS. 12A to 12D are diagrams for explaining an example of processing for recommending invalidating automatic transfer.

DESCRIPTION OF THE EMBODIMENTS

Figure 1:
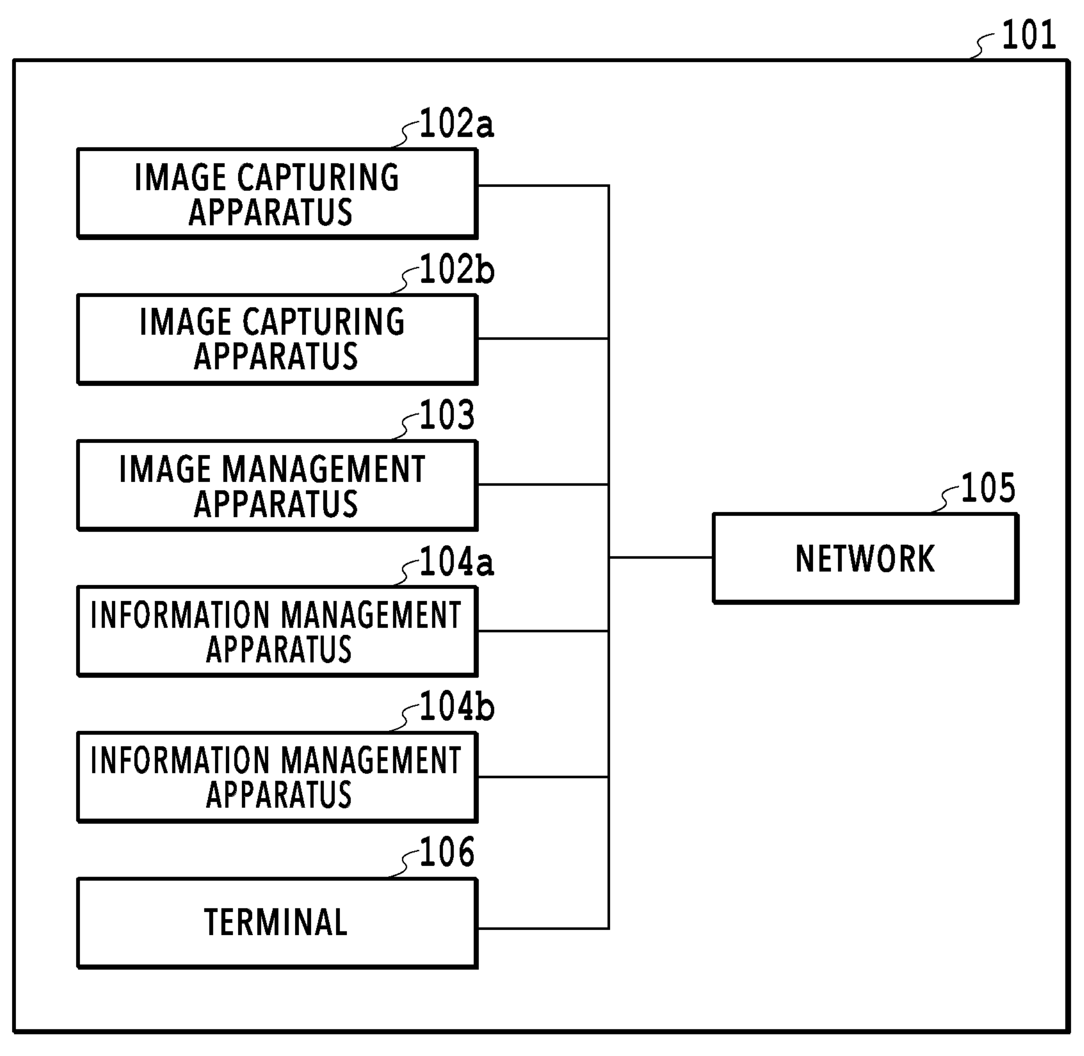
FIG. 1 is a diagram showing an example of a configuration of an image management system.

Hereinafter, an embodiment of the technique of the present disclosure is described with reference to the attached drawings. Note that a configuration shown in the following embodiment is only an example, and the present disclosure is not limited to the configuration shown in the drawings.

In addition, in reference signs, terms different only in alphabets attached behind a number denote apparatuses having the same function, and in a case of indicating one of apparatuses having the same function, the alphabet of reference sign may be omitted in some cases.

Embodiment 1

[Configuration of Image Management System]

FIG. 1 is a system configuration of an image management system 101 according to the present embodiment. The image management system 101 includes image capturing apparatuses 102*a* and 102*b*, an image management apparatus 103, information management apparatuses 104*a* and 104*b*, and a terminal 106.

The image capturing apparatuses 102*a* and 102*b* are two image capturing apparatuses used by the same user. The image capturing apparatuses 102*a* and 102*b* each have a function to automatically transfer a captured image obtained by image capturing to a storage service provided by the image management apparatus 103 through a network 105.

The image management apparatus 103 is an information processing apparatus that provides a cloud service. Specifically, the image management apparatus 103 provides a cloud storage service that receives and stores image data transmitted from the image capturing apparatuses 102*a* and 102*b*.

The user who possesses the image capturing apparatuses 102*a* and 102*b* can use the cloud storage service provided by the image management apparatus 103 by creating an account and registering the user's image capturing apparatuses. The detail of the functions of the image management apparatus 103 are described later.

The information management apparatuses 104*a* and 104*b* each are an information processing apparatus that provides a cloud storage service different from the cloud storage service provided by the image management apparatus 103. The service provided by each of the information management apparatuses 104*a* and 104*b* is referred to as an external storage service or simply as an external service. The description is given on the assumption that the image management system 101 includes the information management apparatuses 104*a* and 104*b* that provide two external services, respectively; however, the number of external services is not limited to two.

The terminal 106 is, for example, a PC, a tablet, a smartphone, or the like. In the terminal 106, a Web application that operates in a browser is installed. The user who has an account for the cloud storage service provided by the image management apparatus 103 can perform browsing, deletion, and the like of an image file stored in the cloud storage service via the Web application. Moreover, the user can change the setting regarding the cloud storage service via the Web application.

The network 105 is, for example, LAN (Local Area Network), the Internet, or the like. The image capturing apparatuses 102*a* and 102*b*, the image management apparatus 103, the information management apparatus 104*a* and 104*b*, and the terminal 106 are coupled via the network 105, so that intercommunications among apparatuses can be achieved.

[Hardware Configuration of Image Capturing Apparatus]

Figure 2:
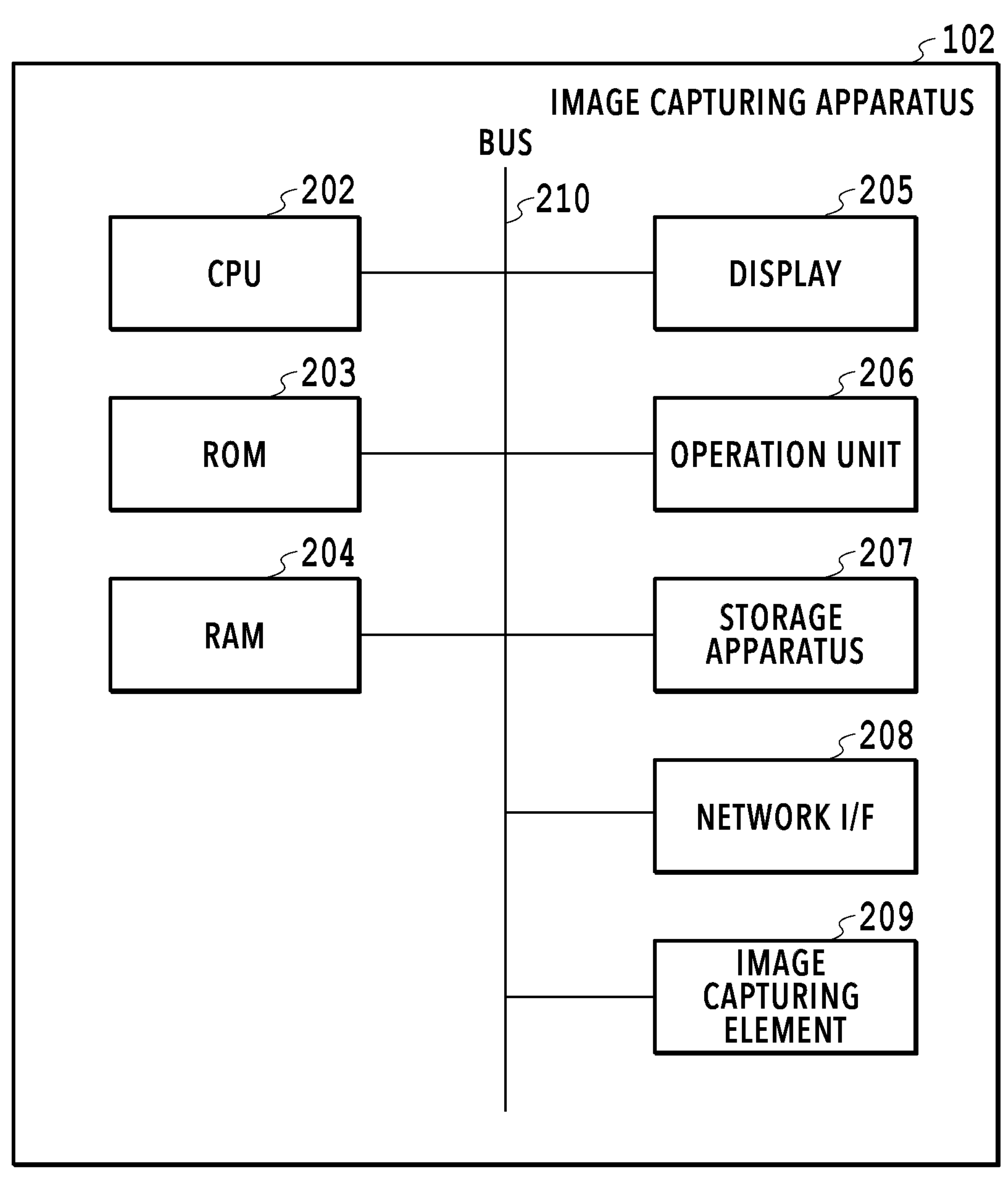
FIG. 2 is a diagram showing an example of a hardware configuration of an image capturing apparatus.

FIG. 2 is a diagram of a hardware configuration of the image capturing apparatus 102*a*. Since the hardware configuration of the image capturing apparatus 102*b* is the same as the configuration described below, its description is omitted. In the case of designating one of the image capturing apparatuses 102*a* and 102*b*, the one is described as the image capturing apparatus 102 by omitting the alphabet of the reference sign in some cases unless otherwise noted. The image capturing apparatus 102*a* includes a CPU 202, a ROM 203, a RAM 204, a display 205, an operation unit 206, a storage apparatus 207, a network I/F 208, an image capturing element 209, and a bus 210.

The CPU 202 is a Central Processing Unit. The CPU 202 reads programs stored in the storage apparatus 207, and interprets and executes the programs to control the RAM 204, the display 205, and the like which are coupled via the bus 210. The ROM 203 is a Read Only Memory that performs input and output control with hardware coupled to the bus 210. The RAM 204 is a Random Access Memory that temporarily stores information used in calculation by the CPU 202.

The display 205 is a display unit that displays a result of processing executed by the CPU 202, and the like. The operation unit 206 is an operation unit that includes a button, a touch panel, and the like, and receives input from the user.

The storage apparatus 207 stores programs and data used in processing by the CPU 202, as well as, captured images captured by the image capturing element 209, and supplementary information such as shutter speed, aperture, photometry method, exposure, ISO sensitivity, and white balance.

The network I/F 208 provides communication functions such as an interface (I/F) to couple to a network such as a local network, an intranet, or the Internet. The image capturing apparatus 102*a* is capable of communicating with other devices such as the image management apparatus 103 via the network 105 from the network I/F 208.

The image capturing element 209 is, for example, a CCD (Charge Coupled Device), a CMOS (Complementary Metal Oxide Semiconductor), or the like, and converts received light into electric signals and records the electric signals as an image.

The bus 210 is a signal line to which each unit of the hardware of the aforementioned image capturing apparatus 102*a* is coupled.

The functions of the image capturing program are achieved by the CPU 202 executing processing based on the programs stored in the storage apparatus 207. The image capturing program includes, for example, a function to transfer a captured image captured by the image capturing apparatus 102 to the cloud storage service provided by the image management apparatus 103 via the network I/F 208.

[Hardware Configuration of Image Management Apparatus]

Figure 3:
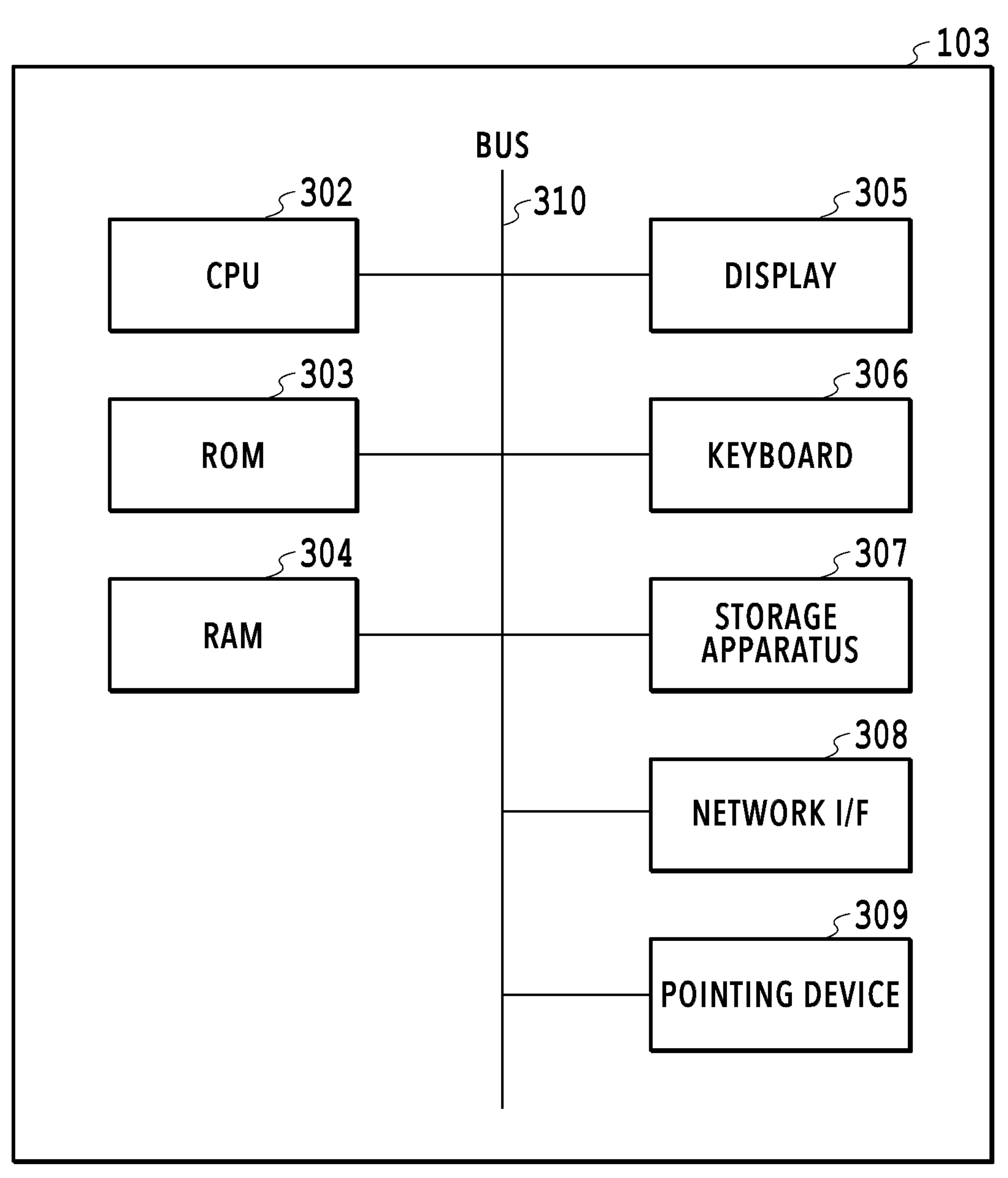
FIG. 3 is a diagram showing an example of a hardware configuration of the image management apparatus.

FIG. 3 is a diagram of a hardware configuration of the image management apparatus 103 according to the present embodiment. The image management apparatus 103 includes a CPU 302, a ROM 303, a RAM 304, a display 305, a keyboard 306, a storage apparatus 307, a network I/F 308, a pointing device 309, and a bus 310. The image management apparatus 103 may be achieved by a single information processing apparatus having each unit in FIG. 3, or may be achieved by a plurality of information processing apparatuses each having at least some of the units in FIG. 3. In a case where the image management apparatus 103 is achieved by a plurality of information processing apparatuses, the plurality of information processing apparatuses are coupled by a LAN or the like to be capable of communicating with one another.

The CPU 302 reads programs stored in the storage apparatus 307, and interprets and executes the programs to control the RAM 304, the display 305, and the like which are coupled to the bus 310. The ROM 303 is a read only memory that performs input and output control with hardware coupled to the bus 310. The RAM 304 is a random access memory that temporarily stores information used in calculation by the CPU 302.

The display 305 is a display unit that displays a result of processing executed by the CPU 302, and the like. The keyboard 306 is an operation unit that receives input from the user. In a case where the display 305 of the image management apparatus 103 includes a touch panel, the keyboard 306 does not have to be included in the image management apparatus 103.

The storage apparatus 307 is a storage apparatus that stores programs and data used in the processing by the CPU 302. In addition, the storage apparatus 307 stores images transferred from the image capturing apparatuses 102*a* and 102*b* of each user for using the storage service.

The network I/F 308 is an interface to couple to a network such as a local network, an intranet, or the Internet. The pointing device 309 is an operation unit that receives input by the user through the operation of the user, such as a mouse or a trackball that receives coordinates designated by the user on the screen. The bus 310 is a signal line to which each unit of the hardware of the aforementioned image management apparatus 103 is coupled. Note that since the hardware configurations of the information management apparatuses 104*a* and 104*b* have the same configuration as that of the image management apparatus 103, its description is omitted.

[Functional Configuration of Image Management Apparatus]

Figure 4:
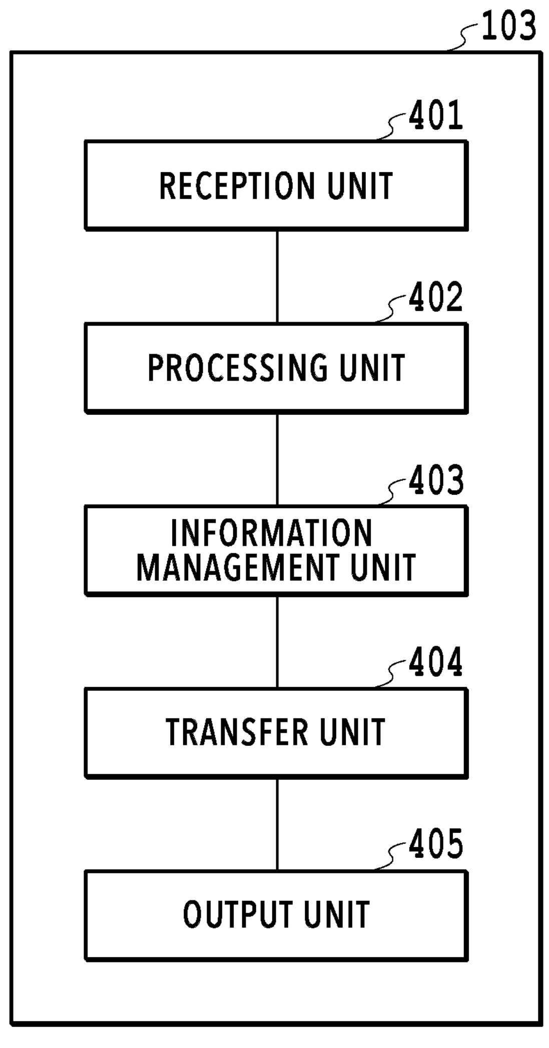
FIG. 4 is a diagram showing an example of a functional configuration of the image management apparatus.

FIG. 4 is a block diagram showing a functional configuration of the image management apparatus 103 of the present embodiment. The image management apparatus 103 includes a reception unit 401, a processing unit 402, an information management unit 403, a transfer unit 404, and an output unit 405.

The reception unit 401 receives captured images transmitted from the image capturing apparatuses 102*a* and 102*b* of the user who is registered for the cloud storage service. In addition, the reception unit 401 receives instructions by the user, which are transmitted from the terminal 106 or the like.

The processing unit 402 performs activation of a program, processing on input from the outside, generation of data corresponding to input from the outside, and the like. For example, the processing unit 402 also functions as an identification unit configured to identify an image capturing apparatus which captured a captured image. In addition, the processing unit 402 also functions as a generation unit configured to generate screen information for displaying the screen.

The information management unit 403 stores and manages transfer setting information, image capturing apparatus information, and external service information, which are described later, in the ROM 303 or the storage apparatus 307.

The transfer unit 404 automatically transfers captured images, which are transmitted from the image capturing apparatuses 102*a* and 102*b* and stored in the storage apparatus 307, to an information management apparatus that provides an external service based on the transfer setting information.

The output unit 405 outputs data corresponding to an instruction from an external apparatus or the like. For example, the output unit 405 outputs the screen information for displaying a transfer setting screen 501 (see FIG. 5) through which the user selects settings regarding automatic transfer to an external service, on the terminal 106, or the image capturing apparatuses 102*a* and 102*b*.

Although each functional unit in the image management apparatus 103 in FIG. 4 is achieved by the CPU 302 of the image management apparatus 103 executing programs, the configuration is not limited to this. Otherwise, for example, hardware such as a GPU or a FPGA which is not shown may be utilized. Each functional unit may be achieved by cooperation of software and hardware such as a dedicated IC, or some or all of the functions may be achieved by only hardware.

[Transfer Setting Screen]

Figure 5:
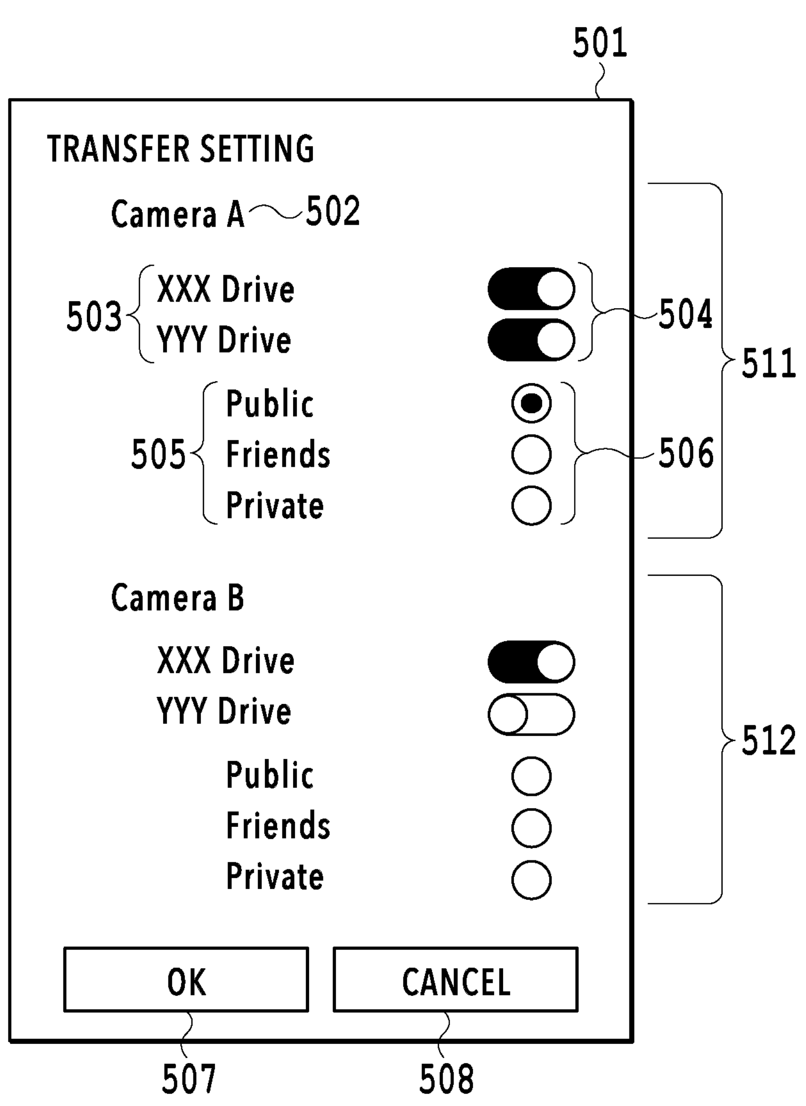
FIG. 5 is a diagram showing an example of a transfer setting screen.

FIG. 5 is a diagram showing an example of the transfer setting screen 501 presented to the user. The transfer setting screen 501 is a screen for the user to select an external service of a transfer destination and the like in a case where the transfer unit 404 automatically transfers a captured image received by the image management apparatus 103. Although the transfer setting screen 501 is described as being displayed on the terminal 106 of the user who has an account for a cloud storage service via a WEB application, the transfer setting screen 501 may be displayed on the displays 205 of the image capturing apparatuses 102*a* and 102*b*.

The transfer setting screen 501 of the present embodiment includes setting regions 511 and 512 as regions through which to select the settings for each image capturing apparatus of the user registered in the image management apparatus 103. It is assumed that the image capturing apparatuses of the user registered in the image management apparatus 103 are "Camera A" corresponding to the image capturing apparatus 102*a* and "Camera B" corresponding to the image capturing apparatus 102*b*. In this case, the transfer setting screen 501 includes the setting region 511 through which to select the settings for "Camera A" and the setting region 512 through which to select the settings for "Camera B".

The setting region 511 is a region through which to select the settings for "Camera A", and a camera name display region 502 is a region that displays the name of the image capturing apparatus for which the settings are selected in the setting region 511. In the camera name display region 502 of the setting region 511, "Camera A" is displayed. Hence, the setting region 511 is a region through which to select the settings for a captured image received from the image capturing apparatus 102*a*, which is "Camera A".

An external service name display region 503 displays the name of the external service which the user registered in the image management apparatus 103. In the present embodiment, it is assumed that the name of the external service provided by the information management apparatus 104*a* is "XXX Drive", and the name of the external service provided by the information management apparatus 104*b* is "YYY Drive". In addition, the description is made on the assumption that "XXX Drive" and "YYY Drive" are registered as external services in the image management apparatus 103.

Switches 504 are provided to correspond respectively to the external services displayed in the external service name display region 503. In a case where the white circle of the switch 504 is moved to the right side for selection, it represents that the automatic transfer to the corresponding external service is selected to be valid. On the other hand, in a case where the white circle is moved to the left side for selection, it represents that the automatic transfer is selected to be invalid.

Hence, the setting region 511 shown in FIG. 5 represents the state in which the automatic transfers to both external services of "XXX Drive" and "YYY Drive" are selected to be valid. Hence, if registration is made in the state of FIG. 5, in a case where the image management apparatus 103 receives a captured image from the image capturing apparatus 102*a*, which is "Camera A", the captured image is automatically transferred by the transfer unit 404 to the information management apparatus 104*a*, which provides "XXX Drive". Moreover, the captured image is also automatically transferred to the information management apparatus 104*b*, which provides "YYY Drive".

On the other hand, the setting region 512 is a region through which to make settings for the image capturing apparatus 102*b*. The setting region 512 shown in FIG. 5 represents the state in which the automatic transfer only to the external service of "XXX Drive" is selected to be valid. Hence, in a case where a captured image is received from the image capturing apparatus 102*a*, the captured image is not automatically transferred by the transfer unit 404 to the information management apparatus 104*b*, which provides "YYY Drive".

A disclosure range display region 505 is a region through which to select the setting value of an attribute of the disclosure range of an image transferred to an external service. Some external services are configured such that a captured image transferred from the image management apparatus 103 can be disclosed. Such an external service is referred to as an image-disclosable external service or an external service having a function to disclose a captured image. In a case where an image-disclosable external service is registered in the image management apparatus 103, the user can select the setting value indicating (the attribute of) the disclosure range of the image-disclosable external service. In the present Specification, the description is made on the assumption that "YYY Drive" is an image-disclosable external service.

The setting values indicating the disclosure range include, for example, "public", "friends", and "private". "public" is a setting value that permits all the users who transmitted a request for obtaining an image to obtain the image. "friends" is a setting value that permits some users who are permitted by the user who possesses an image to obtain the image. User IDs of some users who are permitted by the user who possesses an image are stored in the form of a list in the storage apparatus 307 of the image management apparatus 103. The user who possesses an image designates objects such as the user names, the mail addresses, the face photos, and the like of the other users, which uniquely identify target users. Then, the image management apparatus 103 finds a user ID corresponding to the objects, and adds the user ID to the list, so that a user ID list of the users permitted by the user who possesses the image is created. "private" is a setting value that does not permit users other than the user who possesses an image to obtain the image.

Radio buttons 506 are buttons for selecting the setting value indicating the disclosure range of an image to be transferred to an external service. A black circle is displayed in the white circle for the setting value indicating the selected disclosure range.

An OK button 507 is a button for transmitting the settings selected in the currently displayed transfer setting screen 501 to the image management apparatus 103. A cancel button 508 is a button for instructing cancellation of the selection status made by the user.

In the present embodiment, it is possible to associate an external service of the transfer destination in a case of automatically transferring an image from the image management apparatus 103 with each image capturing apparatus of the user registered in the image management apparatus 103. Hence, in a case where the image management apparatus 103 of the present embodiment has received a captured image from an image capturing apparatus, the image management apparatus 103 of the present embodiment can determine whether an external service is associated with the image capturing apparatus which transmitted the captured image. Then, in a case where an external service is associated, the received captured image can be automatically transferred only to the external service associated with the image capturing apparatus.

For example, there is a case where the user who possesses two image capturing apparatuses wants to transfer a captured image captured with one of the image capturing apparatuses to all the registered external services, but wants to transfer a captured image captured with the other image capturing apparatus only to some of the external services. In such a case, the user can select the transfer destination for each image capturing apparatus through the transfer setting screen 501.

[Configuration of Transfer Setting Information]

FIGS. 6A to 6C are diagrams for explaining the transfer setting information, the image capturing apparatus information, and the external service information, which are managed by the information management unit 403 of the image management apparatus 103. The method for holding data in the transfer setting information, the image capturing apparatus information, and the external service information in FIGS. 6A to 6C is an example, and data may be held in the form of a table. The transfer setting information holds the content of the settings selected by the user through the transfer setting screen 501.

The transfer setting information in FIG. 6A is an example of information that holds the settings regarding the transfer, which are generated in a case where the OK button 507 is pressed in the state of the transfer setting screen 501 in FIG. 5. The transfer setting information in FIG. 6A includes a userId attribute 601 and a devices attribute 602 associated with the userId attribute. The devices attribute 602 includes a deviceId attribute 603, a services attribute 604, a serviceId attribute 605, and a disclosureRange attribute 606.

The userId attribute 601 is a region that holds an ID (referred to as a user ID) for uniquely identifying a user.

The devices attribute 602 is a region that holds a list of image capturing apparatuses registered in association with the user ID. The deviceId attribute 603 is included in the devices attribute 602, and is a region that holds an ID (referred to as a camera ID) for uniquely identifying an image capturing apparatus registered in association with the user ID.

The services attribute 604 is associated with each camera ID, and is a region that holds a list of external services associated with the image capturing apparatus identified by the camera ID. The serviceId attribute 605 is included in the services attribute 604, and is a region that holds an ID (referred to as an external service ID) for uniquely identifying an external service association with the camera ID.

It is assumed that the user selects the switch 504 that validates the automatic transfer to a certain external service in the setting region for a certain image capturing apparatus, and presses the OK button 507, via the transfer setting screen 501. In this case, the external service ID identifying the external service selected as validated for the automatic transfer and the camera ID of the image capturing apparatus are associated and held in the transfer setting information. In this way, in the transfer setting information of the present embodiment, the camera ID identifying the image capturing apparatus of the user is associated with the user ID identifying the user. Moreover, each camera ID is associated with the external service ID identifying the external service of the transfer destination of the captured image. Hence, the image management apparatus 103 of the present embodiment can determine to which external service the received captured image is transferred by referring to the transfer setting information.

The disclosureRange attribute 606 is a region that holds the setting value indicating the disclosure range of an image-disclosable external service among external services associated with an image capturing apparatus associated with a user. The setting values indicating the disclosure range include "public", "friends", "private", and the like as described above.

FIG. 6B is a diagram showing an example of the image capturing apparatus information. The image capturing apparatus information holds information on image capturing apparatuses associated respectively with the camera IDs. A deviceName attribute 611 is a region that holds the name of an image capturing apparatus associated with the camera ID. A seriesName attribute 612 is a region that holds the name of a product series of the image capturing apparatus associated with the camera ID. The image capturing apparatus information in FIG. 6B holds information on image capturing apparatuses associated respectively with the camera IDs "dev01" and "dev02".

FIG. 6C is a diagram showing an example of the external service information. The external service information holds information on external services associated with the respective external service IDs. A serviceName attribute 621 is a region that holds the name of an external service associated with the external service ID. A uri attribute 622 is a region that holds URI (Uniform Resource Identifier) of the external service associated with the external service ID.

The disclosureRange attribute 623 is a region that holds the setting value indicating a settable disclosure range in a case where the external service associated with the external service ID is an image-disclosable external service. The external service information in FIG. 6C holds information on external services associated with the respective external service IDs "srv01" and "srv02".

The transfer setting information in FIG. 6A is transfer setting information in which the user ID is "usr01", showing that the user to which "usr01" is assigned has registered two image capturing apparatuses of camera IDs of "dev01" and "dev02". In addition, from the image capturing apparatus information in FIG. 6B, it can be found that "dev01" represents the image capturing apparatus 102*a* having the name of "CameraA" and "dev02" represents the image capturing apparatus 102*b* having the name of "CameraB". Moreover, in the transfer setting information in FIG. 6A, the image capturing apparatus 102*a* of the camera ID of "dev01" is associated with external services to which the external service IDs of "srv01" and "srv02" are assigned. Referring to the external service information in FIG. 6C, in a case where the image management apparatus 103 receives a captured image captured by the image capturing apparatus 102*a* of "dev01", the automatic transfer of the captured image to the two external services "XXXDrive" and "YYYDrive" is registered to be valid. Among these, the setting value indicating the disclosure range is "Public" for the external service "YYYDrive" of the external service ID of "srv02". Hence, it is set that once a captured image captured by the image capturing apparatus 102*a* of "dev01" is transferred to the external service "YYYDrive", the captured image is disclosed to all the users.

On the other hand, in a case where the image management apparatus 103 receives a captured image captured by the image capturing apparatus 102*b* of "dev02", the automatic transfer of the captured image only to the external service "XXXDrive" of the external service ID of "srv01" is registered to be valid. Hence, even in a case where a captured image captured by the image capturing apparatus 102*b* of "dev02" is received, the captured image is not automatically transferred to the external service "YYYDrive" of the external service ID of "srv02". That is, it is set that a captured image captured by the image capturing apparatus 102*b* is not disclosed.

[Processes of Transfer Setting in Image Management Apparatus]

Figure 7:
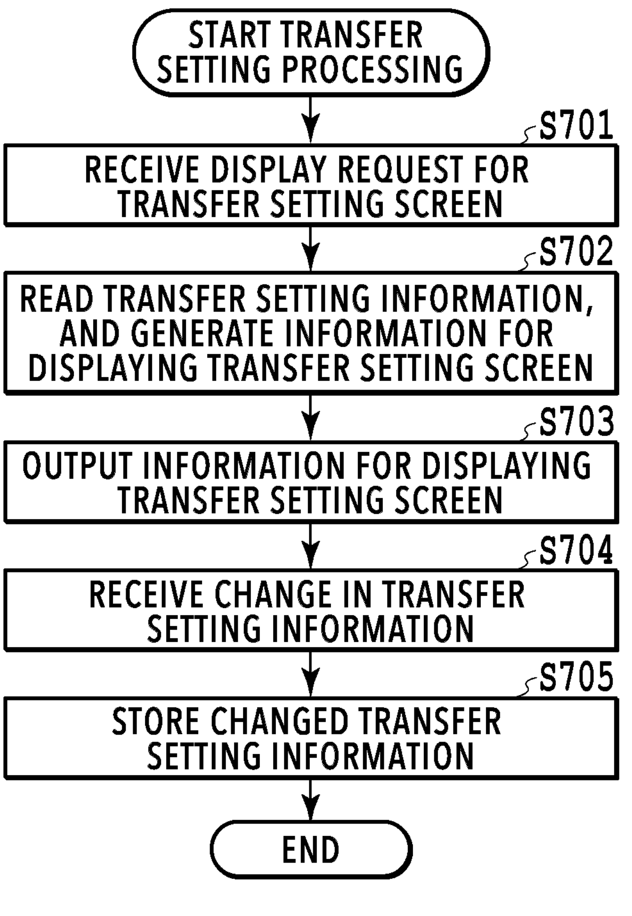
FIG. 7 is a flowchart for explaining an example of a flow of processes of transfer setting.

FIG. 7 is a flowchart for explaining a flow of processes of transfer setting in the image management apparatus 103. The series of processes shown in the flowchart of FIG. 7 are performed by the CPU of the image management apparatus 103 deploying program codes stored in the ROM into the RAM, and executing the program codes. A result of executing each process is stored in the RAM 304. In addition, some or all of the functions in the steps in FIG. 7 may be achieved by hardware such as an ASIC or an electronic circuit. Note that the sign "S" in the description of each process means a step in the flowchart, and the same applies also in the following flowcharts.

In S701, the reception unit 401 receives a display request for the transfer setting screen 501. The present flowchart is described, for example, on the assumption that the user transmits a request for transfer setting to the image management apparatus 103 via a WEB application installed in the terminal 106. In this case, the reception unit 401 receives a display request transmitted from the terminal 106. An instruction for transfer setting may be transmitted from the image capturing apparatus 102.

In S702, the processing unit 402 reads the current transfer setting information managed by the information management unit 403, and generates information for displaying the transfer setting screen 501.

In S703, the output unit 405 output the information for displaying the transfer setting screen 501 to the terminal 106, which is the apparatus which transmitted the display request for the transfer setting screen 501. In the terminal 106 which received the information for displaying the transfer setting screen 501, the transfer setting screen 501 is displayed.

When the user selects settings regarding the automatic transfer and presses the OK button 507 through the transfer setting screen 501, transfer setting information representing the settings selected through the transfer setting screen 501 is transmitted from the terminal 106. In S704, the reception unit 401 receives the transfer setting information transmitted from the terminal 106.

In S705, the information management unit 403 stores and manages the received transfer setting information in the ROM 303 or the storage apparatus 307. In a case where the transfer setting information of the user has already been managed, the transfer setting information is updated to the transfer setting information received at this time.

[Processes of Automatic Transfer to External Service in Image Management Apparatus]

Figure 8:
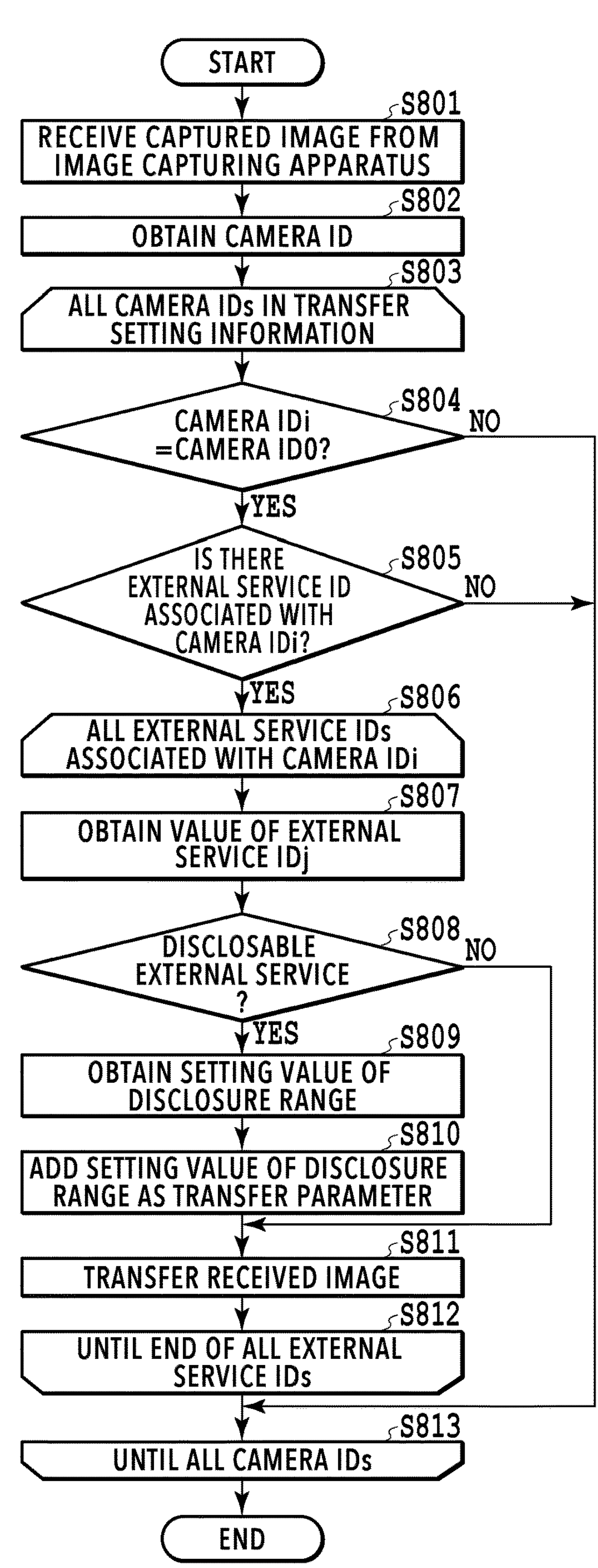
FIG. 8 is a flowchart for explaining an example of a flow of processes of transfer.

FIG. 8 is a flowchart for explaining a flow of processes of automatic transfer in the image management apparatus 103. The series of processes shown in the flowchart of FIG. 8 are performed by the CPU of the image management apparatus 103 deploying program codes stored in the ROM into the RAM, and executing the program codes. A result of executing each process is stored in the RAM 304. In addition, some or all of the functions in the steps in FIG. 8 may be achieved by hardware such as an ASIC or an electronic circuit.

In S801, the reception unit 401 receives a captured image transmitted from the image capturing apparatus 102*a* or 102*b*.

In S802, the processing unit 402 obtains the camera ID of an image capturing apparatus which transmitted the captured image, that is, the image capturing apparatus used for capturing the received captured image, from EXIF added to the captured image received in S801. The camera ID obtained in this step is referred to as a camera ID0.

S803 to S813 are loop processing. In S803, the transfer unit 404 obtains the current transfer setting information of the target user via the information management unit 403, and selects a camera ID to be processed from camera IDs registered in association with the user ID of the user in the transfer setting information. The i-th camera ID to be processed is referred to as a camera IDi. Then, the processes of S804 to S812 are repeated on the camera IDi. Then, in S813, it is determined whether the processes were performed on all the camera IDs associated with the user ID. In a case where the processes have not been performed on all the camera IDs yet, the processing returns to S803, and a camera IDi to be processed is selected from unprocessed camera IDs among the camera IDs associated with the user ID.

In S804, the transfer unit 404 determines whether or not the camera IDi and the camera ID0 coincide. That is, it is determined whether the camera ID0 of the image capturing apparatus which captured the captured image received in S801 and the camera IDi currently to be processed coincide. If it is determined that the camera IDi to be processed coincides with the camera ID0 (YES in S804), the processing proceeds to S805. On the other hand, if it is determined that the camera IDi to be processed does not coincide with the camera ID0 (NO in S804), the processing on the camera IDi currently to be processed is ended, and the processing proceeds to S813 in which it is determined whether all the camera IDs were selected to be processed.

In S805, the transfer unit 404 determines whether there is an external service associated with the camera IDi currently to be processed, based on the transfer setting information. That is, it is determined whether there is an external service ID associated with the camera ID0 of the image capturing apparatus which captured the captured image received in S801. If there is an external service ID associated with the camera ID0 (YES in S805), the processing proceeds to S806. If there is not an external service ID associated with the camera ID0 (NO in S805), the processing proceeds to S813. Otherwise, the present flowchart may be ended.

S806 to S812 are loop processing. In S806, the transfer unit 404 selects an external service ID to be processed from the external service IDs associated with the camera ID currently to be processed, that is, the camera ID0 of the image capturing apparatus which captured the received captured image. The j-th external service ID selected to be processed is referred to as an external service IDj. Then, the processes of S807 to S811 are repeated on the external service IDj to be processed. Then, in S812, it is determined whether the loop processing has been performed on all the external service IDs associated with the camera ID0. In a case where the loop processing has not been performed on all the external service IDs yet, the processing returns to S806, and an external service ID to be processed is selected from unprocessed external service IDs among the external service IDs associated with the camera ID0.

In S807, the transfer unit 404 obtains a value of the external service IDj of the external service currently to be processed from the transfer setting information.

In S808, the transfer unit 404 determines whether or not the setting value indicating the disclosure range is associated with the external service IDj of the external service currently to be processed. That is, it is determined whether or not the external service associated with the external service IDj is an image-disclosable external service. For example, referring to the transfer setting information in FIG. 6A, the external service "XXXDrive" of the external service ID of "srv01" is not associated with the disclosureRange attribute 606. Hence, in the case of the external service IDj=srv01, the determination in S808 can be made to be NO. The determination in S808 may be made based on the external service information in FIG. 6C. In the external service information in FIG. 6C as well, since the external service "XXXDrive" of the external service ID of "srv01" is not associated with the disclosureRange attribute 623, it can be determined that the setting value indicating the disclosure range is not associated. If it is determined that the setting value indicating the disclosure range is associated (YES in S808), the processing proceeds to S809.

In S809, the transfer unit 404 obtains the setting value indicating the disclosure range associated with the external service IDj to be processed which is associated with the camera ID0, from the transfer setting information. For example, in the case where the camera ID0=dev01 and the external service IDj=srv02, "public" set in the disclosureRange attribute 606 is obtained from the transfer setting information in FIG. 6A.

In S810, the transfer unit 404 sets the setting value indicating the disclosure range obtained in S809 in a transfer parameter. This transfer parameter is a parameter additionally transmitted in a case where a captured image received in S801 is transferred to the information management apparatus 104 which provides an external service. This transfer parameter may include the setting value indicating the disclosure range, the title of the image, the explanation, and the like.

After S810 is ended, the processing proceeds to S811. In addition, if it is determined that the setting value indicating the disclosure range is not associated (NO in S808), the processing skips S809 and S810, and proceeds to S811.

In S811, the transfer unit 404 obtains URL of transfer destination from the uri attribute 622 associated with the external service IDj currently to be processed in the external service information in FIG. 6C. For example, the transfer unit 404 obtains URL of the transfer destination by searching the external service information by using the external service IDj as a key. Then, the transfer unit 404 transmits the captured image received in S801 and the transfer parameter to the obtained URL, thus performing the automatic transfer to the external service corresponding to the external service IDj currently to be processed.

In a case where the setting value indicating the disclosure range is obtained in S809, and where the captured image is transferred together with the transfer parameter including the setting value indicating the disclosure range in S811, in the external service of the transfer destination, the image is disclosed within the disclosure range indicated by the setting value obtained in S809.

In the case where the process of S811 is ended, the processing proceeds to S812. In S812, in the case where the loop processing on all the external service IDs registered in association with the camera ID0 is ended, the processing proceeds to S813.

In S813, in the case where the loop processing on all the camera IDs registered in association with the user is ended, the flowchart ends.

As described above, in the present embodiment, it is possible to select an external service to which the automatic transfer is performed for each image capturing apparatus. Moreover, in a case where performing the automatic transfer is selected, it is possible to set the disclosure range of the image in the external service of the transfer destination in association with the image capturing apparatus. Hence, according to the present embodiment, it is possible to prevent a captured image that is not intended to be disclosed by a user from being disclosed in an external service.

Note that the functions of the image management apparatus 103 may include an initialization unit configured to initialize information held in the transfer setting information. For example, the initialization unit initializes the transfer setting information to invalidate the transfer to an external service. Hence, it is possible to prevent a captured image that is not intended to be disclosed from being transferred to an external service.

Besides, the initialization unit initializes the transfer setting information to set the setting value indicating the disclosure range to a non-disclosing setting value such as "private". Hence, even if a captured image is transferred to an external service, it is possible to prevent the captured image that is not intended to be disclosed by the user from being disclosed.

The initialization unit, for example after an external service is registered, initializes information on the registered external service in the transfer setting information. Alternatively, the initialization unit initializes in a case where an image capturing apparatus is newly registered in the transfer setting information when an image capturing apparatus has already been registered in the transfer setting information. In some cases where the transfer to an external service is validated for the first time, it is acknowledged that the user intends to disclose a captured image. However, there may be a possibility that thereafter, in a case where an image capturing apparatus for capturing a captured image that is not intended to be disclosed is registered, the user has forgotten the settings of transfer to the previously registered external service. Hence, in a case where a new image capturing apparatus is registered, it is possible to prevent a captured image that is not intended to be disclosed from being disclosed, by such initialization that does not allow a captured image captured by the image capturing apparatus to be disclosed.

Embodiment 2

In the present embodiment, a method for transferring a received captured image based on a transfer setting screen and transfer setting information having configurations different from Embodiment 1 is described. In the present embodiment, differences from Embodiment 1 are mainly described. Portions that are not particularly specified have the same configurations and processes as those in Embodiment 1, and the configurations of the same functions as those in Embodiment 1 are denoted by the same reference signs, and the descriptions are omitted.

[Transfer Setting Screen]

Figures 9A, 9B:
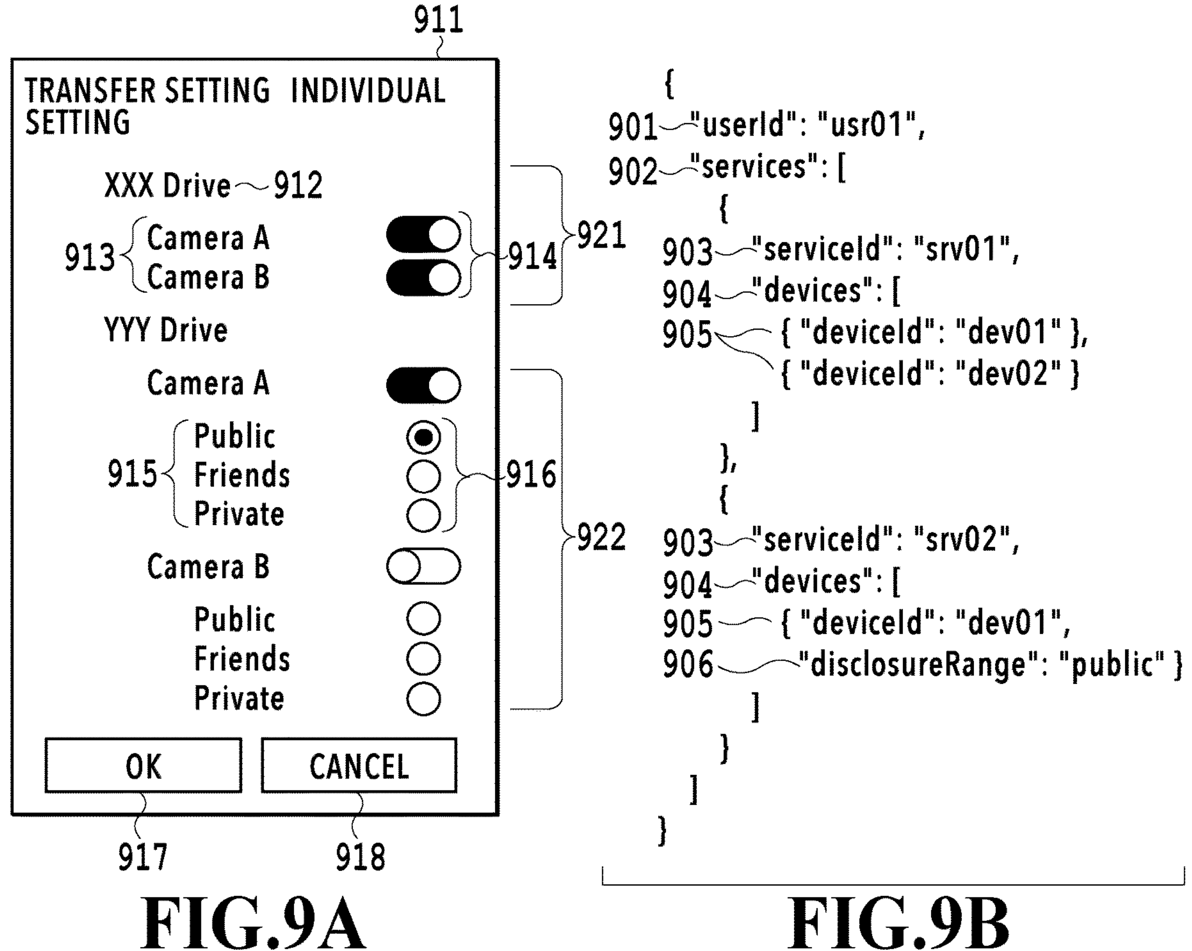
FIGS. 9A and 9B are diagrams showing an example of transfer setting information and a transfer setting screen.

FIG. 9A is a diagram showing an example of a transfer setting screen 911 of the present embodiment. The transfer setting screen 911 of the present embodiment is configured to correspond to transfer setting information of the present embodiment, which is described later. The transfer setting screen 911 of the present embodiment includes setting regions 921 and 922 in the same manner as in the transfer setting screen 501 of Embodiment 1 of FIG. 5. However, unlike Embodiment 1, the setting regions 921 and 922 are provided respectively for registered external services. If it is assumed that the registered external services are "XXX Drive" and "YYY Drive", the transfer setting screen 911 includes the setting region 921 regarding "XXX Drive" and the setting region 922 regarding "YYY Drive".

An external service name display region 912 of the setting region 921 is a region that displays the name of the external service to be set in the setting region 921. Since "XXX Drive" is displayed in the external service name display region 912 of the setting region 921, the setting region 921 is a region through which to set by which image capturing apparatus, a captured image to be transferred to "XXX Drive" was captured.

In a camera name display region 913 included in the setting region 921, the names of image capturing apparatuses registered by the user in the image management apparatus 103 are displayed. Switches 914 are provided to correspond respectively to the image capturing apparatuses displayed in the camera name display region 913. In a case where the white circle of the switch 914 is set to the right side, it represents that for an image captured by the corresponding image capturing apparatus and transmitted to the image management apparatus 103, the automatic transfer to the external service displayed in the external service name display region 912 of the setting region 921 is selected to be valid. On the other hand, in a case where the white circle is set to the left side, it represents that the automatic transfer is selected to be invalid.

On the other hand, the setting region 922 is a region through which to make settings regarding the automatic transfer to "YYY Drive" which is an image-disclosable external service. Hence, in the setting region 922, disclosure-type display regions 915 and radio buttons 916 are provided to correspond respectively to the image capturing apparatuses registered in the image management apparatus 103 in addition to the items included in the setting region 921.

In this way, in the transfer setting screen 911 of the present embodiment, the user can select an image capturing apparatus which captured a captured image to be automatically transferred, for each external service. For example, there is a case where the user registers a large number of image capturing apparatuses in the image management apparatus 103. In this case, selecting an image capturing apparatus to be subjected to the automatic transfer for each external service makes the operation of the user easier. In particular, in a case where a user who frequently uses a specific external service has registered a large number of image capturing apparatuses in the image management apparatus 103, it can be said to be preferable to present the transfer setting screen 911 of the present embodiment to the user.

[Configuration of Transfer Setting Information]

FIG. 9B is a diagram for explaining transfer setting information of the present embodiment. The transfer setting information of the present embodiment includes a userId attribute 901 and a services attribute 902. The services attribute 902 includes a serviceId attribute 903, a devices attribute 904, a deviceId attribute 905, and a disclosureRange attribute 906.

The services attribute 902 is a region that holds a list of external services registered in association with the user ID. The serviceId attribute 903 is a region that holds an external service ID of an external service included in the list of external services. The devices attribute 904 is a region that holds a list of image capturing apparatuses associated with each of the external service IDs for specifying a captured image to be transferred to the external service indicated by the external service ID. That is, the list of image capturing apparatuses for determining whether the captured image is a captured image to be transferred to the external service indicated by the external service ID. The deviceId attribute 905 is a region that holds a camera ID of an image capturing apparatus included in the list of image capturing apparatuses for specifying a captured image to be transferred. The disclosureRange attribute 906 is a region that holds a setting value indicating a disclosure range.

The point different from the transfer setting information of Embodiment 1 is that a camera ID is associated with each external service ID for determining whether the captured image is a captured image to be transferred to the external service. That is, in the services attribute 902, the external service IDs indicating all the registered external services are held in the serviceId attribute 903. Then, each external service ID included in the serviceId attribute 903 is associated with the camera ID of the image capturing apparatus associated with the external service ID.

[Processes of Automatic Transfer to External Service in Image Management Apparatus]

Figure 10:
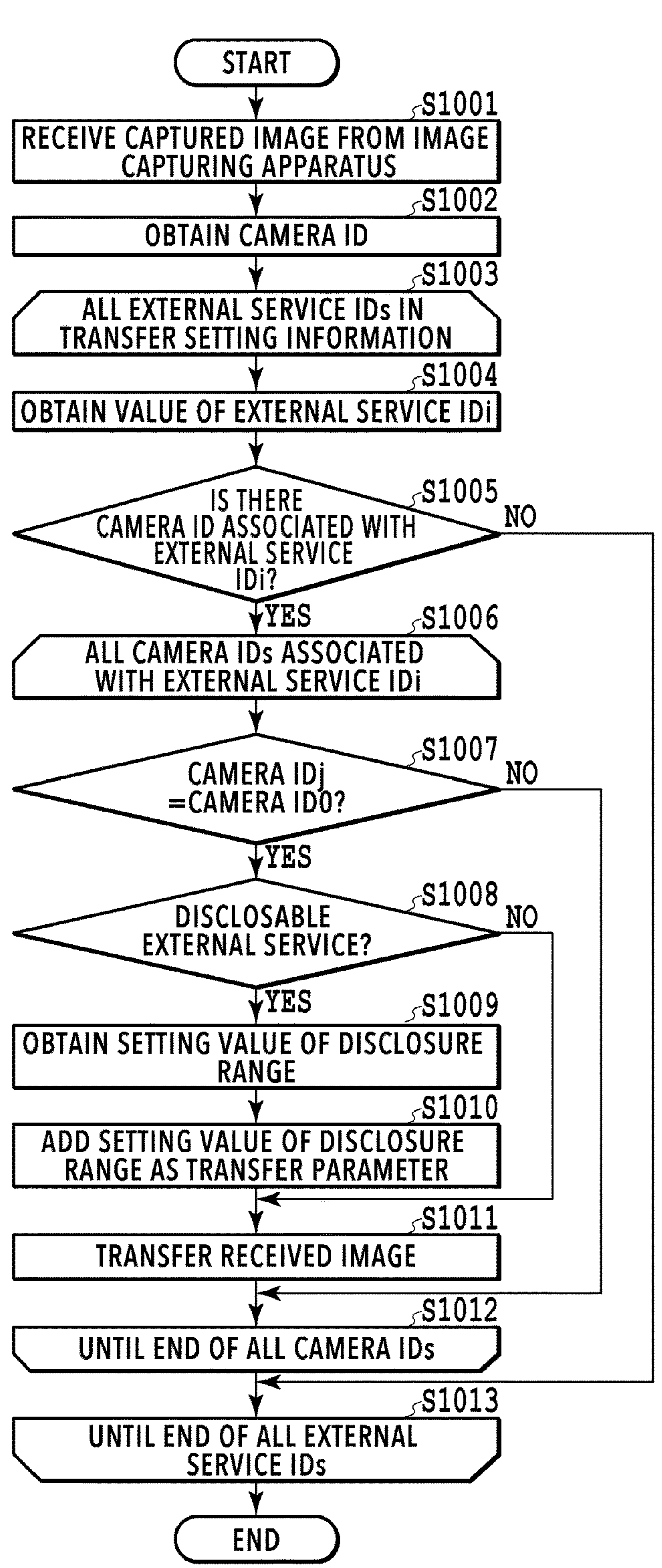
FIG. 10 is a flowchart for explaining an example of a flow of processes of transfer.

FIG. 10 is a flowchart for explaining a flow of processes of automatic transfer in the present embodiment. Since S1001 to S1002 are the same processes as S801 to S802, the descriptions are omitted.

S1003 to S1013 are loop processing. In S1003, the transfer unit 404 obtains the current transfer setting information of the target user via the information management unit 403. Then, the transfer unit 404 selects an external service ID to be processed from external service IDs associated with the user ID of the user in the transfer setting information. The i-th external service ID to be processed is referred to as an external service IDi in the present embodiment. Then, the processes of S1004 to S1012 are repeated on the external service IDi. Then, in S1013, it is determined whether the processes were performed on all the external service IDs, and in a case where the processes have not been performed on all the external service IDs yet, the processing returns to S1003, and an external service IDi to be processed is selected from unprocessed external service IDs.

In S1004, the transfer unit 404 obtains a value of the external service IDi corresponding to the external service currently to be processed from the transfer setting information.

In S1005, the transfer unit 404 determines whether there is a camera ID associated with the external service IDi currently to be processed, based on the transfer setting information. If it is determined that there is a camera ID associated with the external service IDi (YES in S1005), the processing proceeds to S1006. If it is determined that there is not a camera ID associated with the external service IDi (NO in S1005), the processing proceeds to S1013, and it is determined whether all the external service IDs were selected to be processed.

S1006 to S1012 are loop processing. In S1006, the transfer unit 404 selects a camera ID to be processed from camera IDs associated with the external service IDi currently to be processed. The j-th camera ID to be processed is referred to as a camera IDj. Then, the processes of S1007 to S1011 are repeated on the camera IDj to be processed. Then, in S1012, it is determined whether the processes were performed on all the camera IDs associated with the external service IDi. In a case where the processes have not been performed on all the camera IDs yet, the processing returns to S1006, and a camera IDj to be processed is selected from unprocessed camera IDs.

In S1007, the transfer unit 404 determines whether or not the camera IDj currently to be processed and the camera ID0 coincide. If it is determined that the camera IDj to be processed coincides with the camera ID0 (YES in S1007), the processing proceeds to S1008. If it is determined that the camera IDj does not coincide with the camera ID0 (NO in S1007), the loop processing on the camera IDj currently to be processed is ended, and the processing proceeds to S1012 in which it is determined whether all the camera IDs were selected to be processed.

In S1008, the transfer unit 404 determines whether or not the setting value indicating the disclosure range is associated with the external service IDi currently to be processed. The method for determination may be the same as in S808. If it is determined that the setting value indicating the disclosure range is associated (YES in S1008), the processing proceeds to S1009.

In S1009, the transfer unit 404 obtains the setting value indicating the disclosure range associated with the camera ID0 associated with the external service IDi currently to be processed, from the transfer setting information.

In S1010, the transfer unit 404 sets the setting value indicating the disclosure range obtained in S1009 in the transfer parameter.

After S1010 is ended, the processing proceeds to S1011. In addition, if it is determined that the setting value indicating the disclosure range is not associated (NO in S1008), the processing skips S1009 and S1010, and proceeds to S1011.

In S1011, the transfer unit 404 obtains URL of transfer destination from the uri attribute 622 associated with the external service IDi to be processed in the external service information. Then, the transfer unit 404 transmits the captured image received in S1001 and the transfer parameter to the obtained URL, thus performing the automatic transfer to the external service associated with the external service IDi to be processed.

In the case where the process of S1011 is ended, the processing proceeds to S1012. In the case where the loop processing was executed on all the camera IDs associated with the external service IDi to be processed, the processing proceeds to S1013.

In S1013, in the case where the loop processing has been performed on all the external service IDs registered in association with the user, the flowchart ends.

As described above, according to the present embodiment as well, it is possible to prevent a captured image that is not intended to be disclosed by a user from being disclosed in an external service.

Embodiment 3

In the present embodiment, an embodiment regarding a transfer setting screen and transfer setting information having different configurations from the above-described embodiments is described. In the present embodiment, differences from Embodiment 1 are mainly described. Portions that are not particularly specified have the same configurations and processes as those in Embodiment 1, and the configurations of the same functions as those in Embodiment 1 are denoted by the same reference signs, and the descriptions are omitted.

[Configuration of Transfer Setting Screen]

Figures 11A, 11B, 11C:
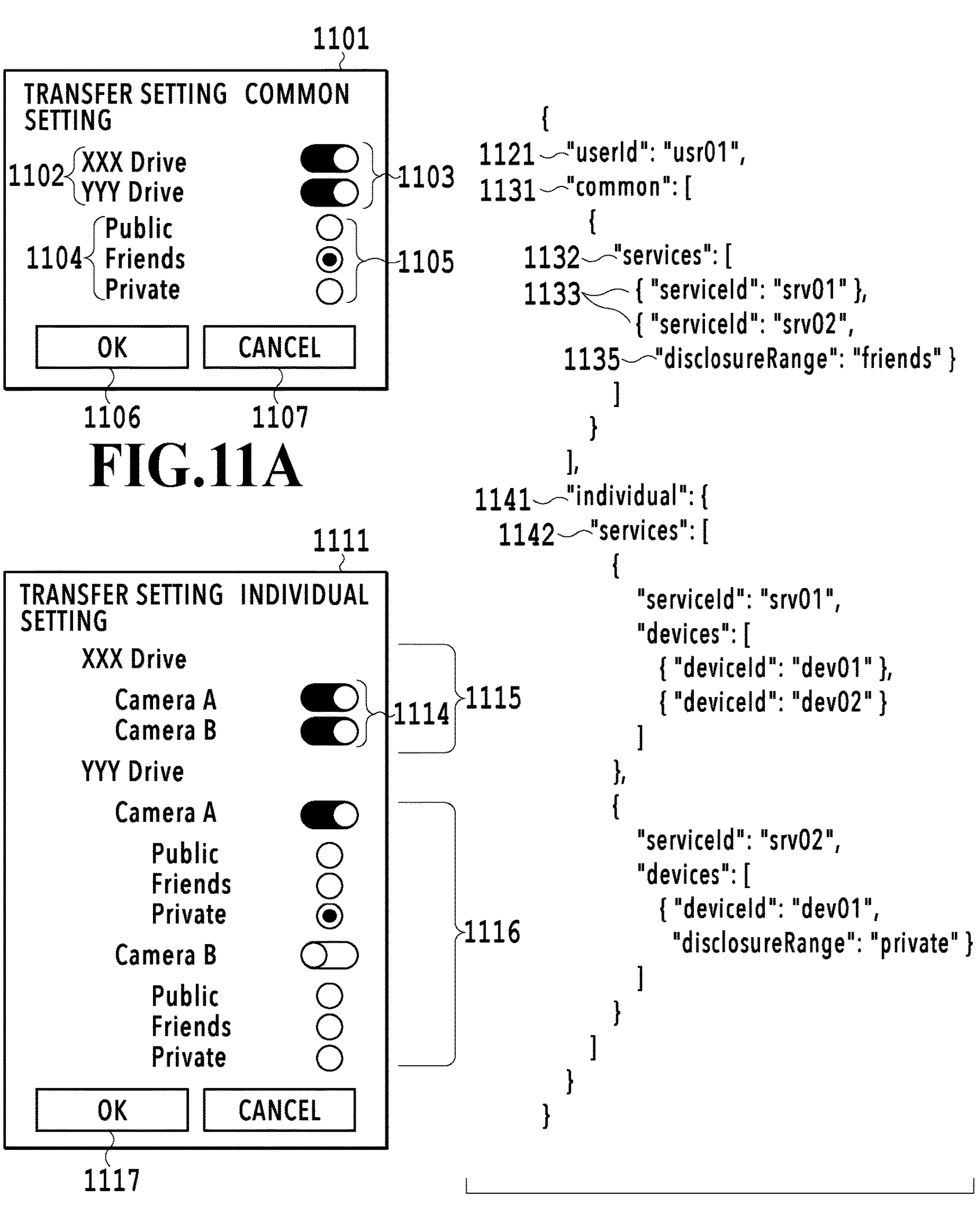
FIGS. 11A to 11C are diagrams showing an example of transfer setting information and a transfer setting screen.

FIGS. 11A and 11B are diagrams showing an example of the transfer setting screen of the present embodiment. The transfer setting screen generated by the processing unit 402 of the present embodiment includes a common setting screen 1101 of FIG. 11A and an individual setting screen 1111 of FIG. 11B.

The individual setting screen 1111 has the same configuration and function as those of the transfer setting screen 911 of Embodiment 2. Specifically, in the individual setting screen 1111, the user can select whether the automatic transfer is validated or invalidated and select a setting value indicating the disclosure range for each image capturing apparatus, on each of external services registered in the image management apparatus 103. In addition, based on the settings selected in the individual setting screen 1111, the transfer unit 404 determines whether the automatic transfer is performed.

The common setting screen 1101 is a screen displayed before the individual setting screen 1111 is displayed on a terminal 106 which received information for displaying a transfer setting screen transmitted in S703 in FIG. 7. The common setting screen 1101 is a screen for selecting settings selected in advance in the individual setting screen 1111 when the individual setting screen 1111 is displayed. Unlike the transfer setting screens of the above-described embodiments, the common setting screen 1101 does not include a region for selecting settings for each image capturing apparatus. It is possible to select whether the automatic transfer is validated or invalidated and select a setting value indicating the disclosure range for each of registered external services.

First, the configuration of the common setting screen 1101 of FIG. 11A is described. Switches 1103 are provided to correspond respectively to the external services displayed in the external service name display region 1102. In a case where the white circle of the switch 1103 is moved to the right side for selection, it represents that the automatic transfer to the corresponding external service is selected to be valid. On the other hand, in a case where the white circle is moved to the left side for selection, it represents that the automatic transfer is selected to be invalid. A disclosure-type display region 1104 and a radio button 1105 are provided below the name of an image-disclosable external service, and are provided for selecting the setting value indicating the disclosure range of an image to be transferred to the external service.

Pressing an OK button 1106 of the common setting screen 1101 transitions the screen to the individual setting screen 1111 of FIG. 11B. The processing unit 402 generates information for displaying the individual setting screen 1111 such that the individual setting screen 1111 to which the screen was transitioned by pressing the OK button 1106 is displayed while reflecting the settings selected in the common setting screen 1101. The information for displaying the individual setting screen 1111 is outputted to the terminal 106 or the like by the output unit 405.

In addition, the settings selected in the common setting screen 1101 can be changed in the individual setting screen 1111. Pressing the OK button 1117 in the individual setting screen 1111 transmits the settings selected in the currently displayed individual setting screen 1111 to the image management apparatus 103.

For example, it is assumed that the switch 1103 corresponding to the external service "XXX Drive" in the common setting screen 1101 is selected to validate the automatic transfer, and then the OK button 1106 is pressed. In this case, in the individual setting screen 1111, switches 1114 corresponding to all the image capturing apparatuses included in a setting region 1115 for setting the external service "XXX Drive" are displayed in the state of being selected to validate the automatic transfer. Hence, in a case where the same settings are to be selected for all the registered image capturing apparatuses, it is only necessary to select the settings in the common setting screen 1101, and after the transition to the individual setting screen 1111, to press the OK button 1117 in this state. Hence, in a case where the user wants to collectively select the same settings, the burden on the user to select a switch or a radio button corresponding to an image capturing apparatus one by one is reduced as compared with the transfer setting screens of the above-described embodiments.

[Configuration of Transfer Setting Information]

FIG. 11C is a diagram for explaining transfer setting information of the present embodiment. The transfer setting information holds the content of the settings in a case where the user presses the OK buttons 1106 and 1117 in the common setting screen 1101 and the individual setting screen 1111. The transfer setting information in FIG. 11C is an example of transfer setting information that is generated in a case where the OK button 1106 or 1117 is pressed in the state of FIG. 11A or 11B.

The transfer setting information of the present embodiment includes a userId attribute 1121, a common attribute 1131, and an individual attribute 1141.

The common attribute 1131 is a region that holds the settings selected by the user in the common setting screen 1101. A services attribute 1132 included in the common attribute 1131 is a region that holds a list of external services for which the automatic transfer is selected in the common setting screen 1101. A serviceId attribute 1133 is a region that holds an external service ID of an external service included in the list of external services. A disclosureRange attribute 1135 is a region that holds a setting value indicating the attribute of a disclosure range.

The individual attribute 1141 is a region that holds the settings selected in the individual setting screen 1111. The individual attribute 1141 includes a services attribute 1142. Since the configuration of the services attribute 1142 of the individual attribute 1141 is the same as the services attribute 902 of the transfer setting information in FIG. 9B, the description is omitted.

The transfer processing in the present embodiment is the same as the flowchart of FIG. 10. The transfer processing is performed with portions described as the transfer setting information in the flowchart of FIG. 10 being read as information of the individual attribute 1141 in the transfer setting information. That is, the transfer processing is performed by referring to a value included in the individual attribute in FIG. 11C.

As described above, according to the present embodiment, the user can collectively select whether the automatic transfer is validated or invalidated for each external service all at once in the registered image capturing apparatus. Hence, the burden for a user to select the settings for each image capturing apparatus can be reduced.

Embodiment 4

In the present embodiment, processing for recommending a user to invalidate the automatic transfer to an image-disclosable external service in a case where predetermined conditions are satisfied is described. In the present embodiment, differences from Embodiment 1 are mainly described. Portions that are not particularly specified have the same configurations and processes as those in Embodiment 1, and the configurations of the same functions as those in Embodiment 1 are denoted by the same reference signs, and the descriptions are omitted.

FIG. 12A is a diagram for explaining the processing for recommending a user to invalidate the automatic transfer to an image-disclosable external service. The sign "S" in FIG. 12A means a step of the processing, and the process of each step is performed by the CPU of the image management apparatus 103 deploying program codes stored in the ROM into the RAM, and executing the program codes.

In S1201, the reception unit 401 receives a captured image transmitted from an image capturing apparatus in the same manner as in S801 in FIG. 8 or S1001 in FIG. 10. Note that the present embodiment is described on the assumption that a captured image is received from the image capturing apparatus 102*b* having the name of "Camera B".

FIG. 12B is a diagram in which part of information included in the transfer setting information is represented with a table. A column 1211 is a column that holds a name of an image capturing apparatus registered in the image management apparatus 103. A column 1212 is a column that holds a setting value indicating a disclosure range selected in association with the external service "YYY Drive" and the image capturing apparatus held in the column 1211.

Each row after the first row of the table of FIG. 12B holds information of the setting value indicating the disclosure range associated with the image capturing apparatus held in the column 1211. It is represented that for the image capturing apparatus of each row, the setting value indicating the disclosure range indicated by an index in the first row in the column that holds "true" is selected. The example of the table of FIG. 12B represents that a captured image transmitted from the image capturing apparatus 102*b* having the name of "Camera B" is transferred to the external service "YYY Drive" with the setting value "private" indicating the disclosure range being set in the transfer parameter.

Then, it is assumed that in S806 of the flowchart of FIG. 8, the image-disclosable external service "YYY Drive" is selected as an external service to be processed. In this case, the transfer processing to the external service "YYY Drive" is performed in S811 based on the transfer setting information of FIG. 12B. Alternatively, in a case wherein S1003 of the flowchart of FIG. 10, the image-disclosable external service "YYY Drive" is selected as an external service to be processed, the transfer processing is performed in S1011 based on the transfer setting information of FIG. 12B. After the transfer processing to the external service "YYY Drive" is executed, the following processes of S1202 to S1205 in FIG. 12A are executed. In S1202 to S1205, processing for recommending the user to change the settings regarding the automatic transfer to the external service "YYY Drive" regarding the image capturing apparatus 102*b* is performed.

In S1202, the processing unit 402 requests transmission of an image stored in the account of the user of the external service or a list of images stored therein from the information management apparatus which provides an image-disclosable external service. In the description of the present embodiment, it is assumed that the image-disclosable external service is "YYY Drive", and the information management apparatus which provides the external service is the information management apparatus 104*b*.

In S1203, the processing unit 402 receives a stored image or list from the information management apparatus 104*b* which provides the image-disclosable external service. The following description is made on the assumption that a list of images stored in the account of the user of the external service "YYY Drive" is requested and received.

A table of FIG. 12D is a diagram showing an example of a list of captured images stored in the account of the user of the external service "YYY Drive". A column 1231 is a column that holds IDs for uniquely identifying stored captured images. A column 1232 is a column that holds image-capture dates of the stored captured images. A column 1233 is a column that holds setting values indicating disclosure ranges of the captured images stored in the external service "YYY Drive". It is assumed that the captured images contained in the table of FIG. 12D are captured images captured by the image capturing apparatus 102*b*.

In S1204, the processing unit 402 obtains a list of history of captured images automatically transferred to the image-disclosable external service.

A table of FIG. 12C is a diagram showing an example of a list of history of automatically transferring captured images received by the image management apparatus 103 to "YYY Drive". A column 1221 is a column that holds IDs for uniquely identifying transferred captured images. A column 1222 is a column that holds image-capture dates of the transferred captured images. A column 1223 shows setting values indicating disclosure ranges set in the transfer parameter in cases where the captured images were transferred to "YYYDrive". It is assumed that the captured images contained in the table of FIG. 12C are captured images captured by the image capturing apparatus 102*b*.

Then, the processing unit 402 compares the captured images held in the list of transfer history of FIG. 12C and the captured images held in the list of captured images stored in the account of the user of "YYY Drive" of FIG. 12D. Note that it is assumed that captured images after a predetermined image-capture date are compared. In addition, it is assumed that captured images captured by the same image capturing apparatus are compared.

As a result of comparison, the ratio of the number of captured images deleted in "YYY Drive" to the number of captured images transferred to "YYY Drive" is calculated, and it is determined whether the ratio is equal to or more than a threshold. In a case where all the transferred captured images were deleted in "YYY Drive", the ratio is calculated to be 100%. In a case where the processing unit 402 determines that the calculated ratio is equal to or more than the threshold, the processing proceeds to S1205. On the other hand, in a case where the processing unit 402 determines that the calculated ratio is less than the threshold, the processing ends without executing S1205, which is described later.

For example, the list of transfer history of FIG. 12C and the list of captured images stored in the account of the user of "YYY Drive" of FIG. 12D are compared. Then, it is found that among five captured images transferred to "YYY Drive", there are two captured images stored in "YYY Drive". Hence, since three captured images were deleted among the transferred captured images, the ratio of the number of captured images deleted in the external service is equal to or more than 50%. Hence, in a case where the threshold is set to 50%, as a result of determination of S1204, the processing proceeds to S1205.

In S1205, the processing unit 402 performs processing for recommending the user to invalidate the setting of automatically transferring captured images captured by the image capturing apparatus, which were compared in S1204, to the image-disclosable external service. As a method for recommending the user to invalidate the automatic transfer, for example, a confirmation screen on whether the setting of automatically transferring captured images captured by the image capturing apparatus 102*b* to "YYY Drive" is changed is displayed on the terminal 106 of the user. Alternatively, a transfer setting screen in the state where the setting of automatically transferring captured images captured by the image capturing apparatus 102*b* to "YYY Drive" is selected to be invalid is displayed on the terminal 106 of the user.

In this way, in a case where a captured image automatically transferred to an image-disclosable external service was deleted in the external service, it can be considered that the automatically transferred captured image was an image which the user did not want to disclose. Hence, in a case where a large number of captured images captured by a certain image capturing apparatus were deleted in an external service, it can be considered that the image capturing apparatus is an image capturing apparatus for capturing a captured image that is not intended to be disclosed. Hence, according to the present embodiment, it is possible to prevent a captured image that is not intended to be disclosed from being disclosed by recommending a user to review the transfer setting.

Note that although the threshold is described as a predetermined ratio, the threshold may be a predetermined number of images.

In addition, the processes of S1202 to S1205 may be executed before the automatic transfer to the external service is executed in S811 in FIG. 8 or S1011 in FIG. 10. In this case, the automatic transfer of a captured image received in S1201 is stopped until S1202 to S1205 are executed. Then, the processing is not transitioned to S1205 as a result of determination of S1204, and the transfer to the external service is executed. Otherwise, after the processing is transitioned to S1205 as a result of determination of S1204 and the recommendation to the use is performed in S1205, in a case where the setting of automatic transfer remains as it is, the transfer to the external service is executed.

Embodiment 5

In the present embodiment, processing for issuing a notification to a user to recommend changing a setting value indicating a disclosure range regarding transfer of an image to an image-disclosable external service in a case where predetermined conditions are satisfied is described. In the present embodiment, differences from Embodiment 1 are mainly described. Portions that are not particularly specified have the same configurations and processes as those in Embodiment 1, and the configurations of the same functions as those in Embodiment 1 are denoted by the same reference signs, and the descriptions are omitted.

Figures 13A, 13B, 13C:
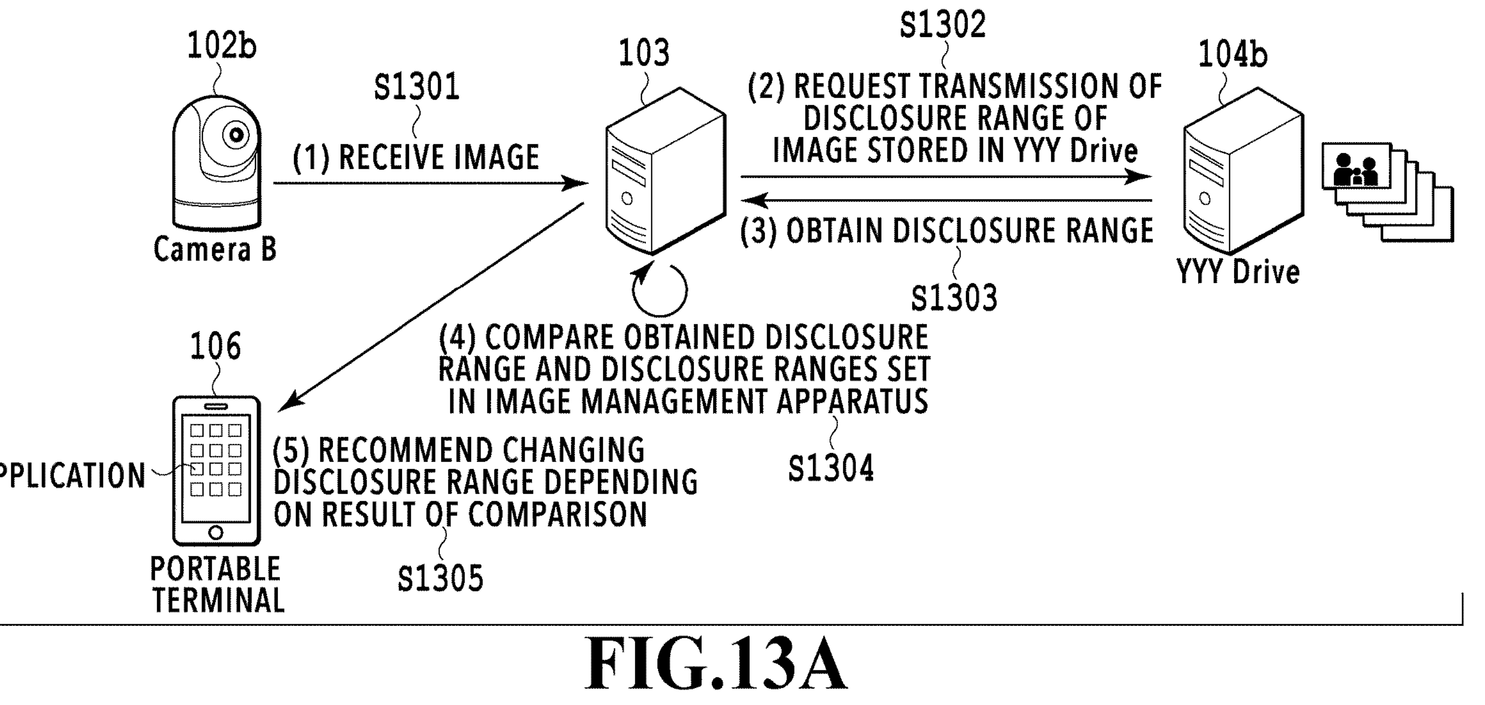
FIGS. 13A to 13C are diagrams for explaining processing for recommending changing a disclosure range.

FIG. 13A is a diagram for explaining processing for recommending changing a setting regarding transfer of an image to an image-disclosable external service. The process of each step in FIG. 13A is performed by the CPU of the image management apparatus 103 deploying program codes stored in the ROM into the RAM, and executing the program codes.

S1301 is the same process as S1201 in FIG. 12A. Then, the processing for automatically transferring a captured image received in S1301 to an external service is performed based on transfer setting information. Note that processes of S1302 to S1305 may be performed before the processing of automatically transferring a captured image to an external service is executed, as in the case of Embodiment 4.

FIG. 13B is a diagram in which part of information included in the transfer setting information is represented with a table, and the configuration of the table is the same as the table in FIG. 12A. In the example of the table of FIG. 13B, a captured image transmitted from the image capturing apparatus 102*b* having the name of "Camera B" is transferred to the external service "YYY Drive" with the setting value "Friends" indicating the disclosure range being set in the transfer parameter.

In S1302, the processing unit 402 requests a list of setting values indicating disclosure ranges of captured images stored in the account of the user of the image-disclosable external service from the information management apparatus which provides the image-disclosable external service. In the description of the present embodiment, it is assumed that the image-disclosable external service is "YYY Drive", and the information management apparatus which provides the external service is the information management apparatus 104*b*.

In S1303, the processing unit 402 receives the list of the setting values indicating the disclosure ranges of the stored captured images from the information management apparatus 104*b* which provides the image-disclosable external service.

A table of FIG. 13C is a diagram showing an example of a list of setting values indicating disclosure ranges of captured images stored in the account of the user of "YYY Drive". A column 1331 is a column that holds IDs for uniquely identifying stored captured images. A column 1332 is a column that holds image-capture dates of the stored captured images. A column 1333 is a column that holds setting values indicating disclosure ranges of the captured images stored in "YYY Drive".

In S1304, the processing unit 402 obtains, from transfer setting information, a setting value indicating a disclosure range to be added to a transfer parameter in a case where the image management apparatus 103 automatically transfers an image to an image-disclosable external service. Then, the processing unit 402 compares the obtained setting value indicating the disclosure range (the setting value indicating the disclosure range of FIG. 13B) and setting values indicating disclosure ranges after a predetermined image-capture date in the list of FIG. 13C. Note that it is assumed that a setting value indicating a disclosure range associated with a certain image capturing apparatus, which is obtained from transfer setting information, and a setting value indicating a disclosure range of a captured image captured by the image capturing apparatus in an external service are compared.

Specifically, among the setting values indicating the disclosure ranges after the predetermined image-capture date in the table of FIG. 13C, the ratio of setting values different from the setting value held in the current transfer setting information of FIG. 13B is calculated, and it is determined whether the ratio is equal to or more than a threshold. In a case where all the setting values indicating the disclosure ranges were changed in the external service "YYY Drive", the calculated ratio is 100% in principle. In a case where the processing unit 402 determines that the calculated ratio is less than the threshold, the processing ends without executing S1305, which is described later. On the other hand, in a case where the processing unit 402 determines that the calculated ratio is equal to or more than the threshold, the processing proceeds to S1305.

For example, in the transfer setting information of FIG. 13B, the setting value indicating the disclosure range to be selected and added to the transfer parameter at the time of transfer is selected to be "Friends". On the other hand, referring to the setting values indicating the disclosure ranges selected with "YYY Drive" held in the column 1333 of the table of FIG. 13C, it is found that there are three captured images having the setting values different from the setting value "Friends" at the time of transfer, among five transferred captured images. Hence, for the captured images of 50% or more of the captured images transferred from the image management apparatus 103, the setting values indicating the disclosure ranges were changed in "YYY Drive" of the transfer destination. Hence, in a case where the threshold is set to 50%, as a result of determination of S1304, the processing proceeds to S1305.

In S1305, the processing unit 402 performs the processing of recommending the user to change the setting regarding automatic transfer of a captured image captured by the image capturing apparatus to be compared in S1204 to an image-disclosable external service. For example, recommendation is made to change the setting value indicating the disclosure range of the image capturing apparatus 102*b* held in the transfer setting information to the most frequently selected setting value among setting values indicating disclosure ranges selected for captured images captured by the image capturing apparatus 102*b* in "YYY Drive". In the list of FIG. 13C, the most frequently selected setting value is "Private". Hence, the processing unit 402 performs the processing of recommending the user to change the setting value of "Camera B" (the image capturing apparatus 102*b*) held in the transfer setting information of FIG. 13B from "Friend" to "Private".

As a method for recommending the user to change the setting, for example, a confirmation screen on whether the setting of automatically transferring captured images captured by the image capturing apparatus 102*b* to "YYY Drive" is changed, is displayed on the terminal 106 of the user. Alternatively, a transfer setting screen in the state in which the setting value indicating the disclosure range in a case where a captured image captured by the image capturing apparatus 102*b* is automatically transferred to "YYY Drive" was changed to "Private" is displayed on the terminal 106 of the user.

In this way, in a case where the disclosure range of a captured image automatically transferred to an image-disclosable external service was changed in the external service, it is possible that the setting value indicating the disclosure range held in the transfer setting information was wrongly selected. In a case where the setting value indicating the disclosure range was changed to be non-disclosure, it is possible that the automatically transferred captured image was not wanted to be disclosed. In particular, in a case where the setting value was changed to non-disclosure for a captured image captured by the same image capturing apparatus, it is possible that the image capturing apparatus is an image capturing apparatus for capturing a captured image that is not intended to be disclosed. Hence, according to the present embodiment, since the user can be recommended to change the transfer setting, it is possible to prevent a captured image that is not intended to be disclosed from being disclosed.

Note that although the threshold is described as a predetermined ratio, the threshold may be a predetermined number of images. In addition, the determination of S1204 may be made to be weighted with a temporal distance of an image-capture date based on the current date. In this case, the determination may be made by comparing such a weighted sum that 1 point is given in a case where the setting value of the transfer setting information and the setting value in the external service coincide and 0 point is given in a case where the setting values do not coincide with a threshold.

OTHER EMBODIMENTS

The above-described embodiments may take, for example, embodiments as systems, apparatuses, methods, programs, recording media (storage media), or the like. Specifically, the embodiments may be applied to a system including a plurality of devices (for example, a host computer, an interface device, an image capturing apparatus, a Web application, and the like), or may be applied to an apparatus including a single device.

In addition, it goes without saying that the above-described embodiments are achieved as follows. That is, a recording medium (or a storage medium) that has recorded program codes (computer programs) of software that achieves the functions of the above-described embodiments is supplied to a system or apparatus. It goes without saying that this storage medium is a readable storage medium. Then, a computer (or a CPU or MPU) of the system or apparatus reads program codes stored in the storage medium and executes the program codes. In this case, the program codes read from the recording medium themselves achieve the functions of the aforementioned embodiments, and thus the recording medium in which the program codes are recorded is included in the technique of the above-described embodiments.

The present disclosure makes it possible to properly manage transfer destinations of captured images in a cloud service depending on the usages of a user.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-106943 filed Jul. 1, 2022, which are hereby incorporated by reference wherein in their entirety.

What is claimed is:

1. A method for controlling an image management apparatus, the method comprising:

receiving a captured image transmitted from a plurality of image capturing apparatuses of a user;

transferring the received captured image to an external storage service;

outputting information which is used for displaying a transfer setting screen on a user device, the transfer setting screen (i) including a camera name identifying each of the plurality of image capturing apparatuses, a plurality of permission levels, and a name indicating the external storage service and (ii) being a screen where the user can select, for each camera name and from among the plurality of permission levels, a permission level used to determine whether to disclose the transferred captured image to other users in the external storage service; and managing transfer setting information in which the external storage service and a setting value indicating a selected permission level which is used for disclosing the transferred captured image at the selected permission level are associated based on information which is sent from the user device, wherein information indicating the selected permission level is transferred to the external storage service based on the transfer setting information.

2. An image management apparatus, comprising:

one or more memories configured to store instructions; and one or more processors configured to execute the instructions stored in the one or more memories to:

receive a captured image transmitted from a plurality of image capturing apparatuses of a user;

transfer the received captured image to an external storage service;

output information which is used for displaying a transfer setting screen on a user device, the transfer setting screen (i) including a camera name identifying each of the plurality of image capturing apparatuses, a plurality of permission levels, and a name indicating the external storage service and (ii) being a screen where the user can select, for each camera name and from among the plurality of permission levels, a permission level used to determine whether to disclose the transferred captured image to other users in the external storage service; and manage transfer setting information in which the external storage service and a setting value indicating a selected permission level which is used for disclosing the transferred captured image at the selected permission level are associated based on information which is sent from the user device, wherein information indicating the selected permission level is transferred to the external storage service based on the transfer setting information.

3. The image management apparatus according to claim 2, wherein the transfer setting screen includes names of a plurality of the external storage services as the name indicating the external storage service.

4. The image management apparatus according to claim 2, wherein the transfer setting screen includes Public, Friends, and Private as the plurality of permission levels.

5. The image management apparatus according to claim 4, wherein the information which is sent from the user device indicates one of the plurality of permission levels.

6. The image management apparatus according to claim 5, wherein the information which is sent from the user device indicates one of the plurality of permission levels associated with the external storage service.

7. The image management apparatus according to claim 2, wherein the received captured image is automatically transferred to the external storage service.

8. The image management apparatus according to claim 2, wherein in a case where the user selects a permission level indicating that a captured image is not to be disclosed for a first camera name in the transfer setting screen, the captured image transmitted from the image capturing apparatus indicated by the first camera name is not disclosed to the other users in the external storage service.

9. The image management apparatus according to claim 2, wherein the information indicating the selected permission level is transferred to the external storage service when the received captured image is transferred to the external storage service.

10. A non-transitory storage medium storing a program causing an image management apparatus to execute a method, the method comprising receiving a captured image transmitted from a plurality of image capturing apparatuses of a user;

transferring the received captured image to an external storage service;

outputting information which is used for displaying a transfer setting screen on a user device, the transfer setting screen (i) including a camera name identifying each of the plurality of image capturing apparatuses, a plurality of permission levels, and a name indicating the external storage service and (ii) being a screen where the user can select, for each camera name and from among the plurality of permission levels, a permission level used to determine whether to disclose the transferred captured image to other users in the external storage service; and managing transfer setting information in which the external storage service and a setting value indicating a selected permission level which is used for disclosing the transferred captured image at the selected permission level are associated based on information which is sent from the user device, wherein information indicating the selected permission level is transferred to the external storage service based on the transfer setting information.

* * * * *